US009960646B2

(12) United States Patent
Sasajima

(10) Patent No.: US 9,960,646 B2
(45) Date of Patent: May 1, 2018

(54) FIXING RESIN COMPOSITION FOR USE IN ROTOR

(75) Inventor: Hideaki Sasajima, Tokyo (JP)

(73) Assignee: SUMITOMO BAKELITE CO., LTD., Tokyo (JP)

(*) Notice: Subject to any disclaimer, the term of this patent is extended or adjusted under 35 U.S.C. 154(b) by 773 days.

(21) Appl. No.: 13/820,367

(22) PCT Filed: Aug. 29, 2011

(86) PCT No.: PCT/JP2011/004789
§ 371 (c)(1),
(2), (4) Date: Mar. 1, 2013

(87) PCT Pub. No.: WO2012/029278
PCT Pub. Date: Mar. 8, 2012

(65) Prior Publication Data
US 2013/0162063 A1 Jun. 27, 2013

(30) Foreign Application Priority Data

Sep. 2, 2010 (WO) ................ PCT/JP2010/005406

(51) Int. Cl.
H02K 1/27 (2006.01)
H02K 1/04 (2006.01)
(Continued)

(52) U.S. Cl.
CPC ............. *H02K 1/2766* (2013.01); *H02K 1/04* (2013.01); *H02K 1/27* (2013.01); *C08G 59/621* (2013.01);
(Continued)

(58) Field of Classification Search
CPC ....... C08L 63/00; C08L 63/04; C08G 59/621; C08G 59/688; H02K 1/27; H02K 1/276; H02K 5/02; H02K 15/03
(Continued)

(56) References Cited

U.S. PATENT DOCUMENTS 3,999,157 A    12/1976  Philofsky et al.
4,923,520 A *   5/1990  Anzai ...................... C08K 7/18
                                                   106/287.34

(Continued)

FOREIGN PATENT DOCUMENTS

CN         1854186 A    11/2006
CN       101090944 A    12/2007
(Continued)

OTHER PUBLICATIONS

Ishida et al., Handbook of Benzoxazine Resins, 2011, Elsevier, p. 431.*
(Continued)

*Primary Examiner* — Bernard Rojas
*Assistant Examiner* — Rashad Johnson
(74) *Attorney, Agent, or Firm* — Birch, Stewart, Kolasch & Birch, LLP

(57) ABSTRACT

The fixing resin composition for use in a rotor includes a thermosetting resin (A) containing an epoxy resin, a curing agent (B), and an inorganic filler (C), wherein the content of the inorganic filler (C) is equal to or more than 50% by mass, based on 100% by mass of the total content of the fixing resin composition.

31 Claims, 8 Drawing Sheets

(51) Int. Cl.
C08L 63/04 (2006.01)
C08G 59/62 (2006.01)
C08G 59/68 (2006.01)
C08L 63/00 (2006.01)

(52) U.S. Cl.
CPC ............ C08G 59/688 (2013.01); C08L 63/00 (2013.01); C08L 63/04 (2013.01)

(58) Field of Classification Search
USPC ....... 264/261; 29/596, 598; 310/43; 523/400
See application file for complete search history.

(56) References Cited

U.S. PATENT DOCUMENTS

| | | | |
|---|---|---|---|
| 5,077,325 A | 12/1991 | Akutagawa et al. | |
| H1439 H * | 5/1995 | Hairston | 525/523 |
| 5,726,391 A * | 3/1998 | Iyer | H01L 23/293 |
| | | | 174/521 |
| 6,523,397 B1 * | 2/2003 | Tosaki | G01N 11/142 |
| | | | 73/54.28 |
| 7,173,509 B2 | 2/2007 | Kumano et al. | |
| 7,471,182 B2 | 12/2008 | Kumano et al. | |
| 7,612,458 B2 | 11/2009 | Nakamura | |
| 7,854,056 B2 * | 12/2010 | Watanabe | H02K 15/03 |
| | | | 29/596 |
| 8,158,095 B2 | 4/2012 | Yoshinaga et al. | |
| 8,293,860 B2 | 10/2012 | Yoshinaga et al. | |
| 8,409,756 B2 | 4/2013 | Yoshinaga et al. | |
| 8,411,415 B2 | 4/2013 | Yoshinaga et al. | |
| 8,658,120 B2 | 2/2014 | Yoshinaga et al. | |
| 2003/0055131 A1 * | 3/2003 | Ukai | B05D 7/16 |
| | | | 523/440 |
| 2004/0014842 A1 * | 1/2004 | Takeda | C08G 59/3227 |
| | | | 523/400 |
| 2004/0046632 A1 | 3/2004 | Kumano et al. | |
| 2005/0107497 A1 * | 5/2005 | Akaho | C08K 3/346 |
| | | | 523/457 |
| 2006/0009547 A1 * | 1/2006 | Maeshima | C07D 301/14 |
| | | | 523/427 |
| 2006/0025501 A1 * | 2/2006 | Osada | C08L 63/00 |
| | | | 523/457 |
| 2006/0029811 A1 | 2/2006 | Sugioka et al. | |
| 2006/0228561 A1 | 10/2006 | Nakamura | |
| 2006/0241215 A1 | 10/2006 | Osada et al. | |
| 2007/0188289 A1 | 8/2007 | Kumano et al. | |
| 2009/0026867 A1 | 1/2009 | Haruno et al. | |
| 2009/0032295 A1 * | 2/2009 | Okajima | H05K 1/0203 |
| | | | 174/260 |
| 2009/0072655 A1 * | 3/2009 | Sano | H02K 1/185 |
| | | | 310/216.016 |
| 2009/0174273 A1 | 7/2009 | Watanabe et al. | |
| 2009/0279300 A1 * | 11/2009 | Okajima | H05K 1/0203 |
| | | | 362/249.02 |
| 2009/0326100 A1 * | 12/2009 | Hamada | C08G 77/14 |
| | | | 523/435 |
| 2010/0004356 A1 | 1/2010 | Yoshinaga et al. | |
| 2010/0074831 A1 | 3/2010 | Yoshinaga et al. | |
| 2010/0075228 A1 | 3/2010 | Yoshinaga et al. | |
| 2010/0104866 A1 * | 4/2010 | Shimazumi | C08F 6/28 |
| | | | 428/357 |
| 2010/0160494 A1 * | 6/2010 | Yonehama | B32B 7/12 |
| | | | 523/400 |
| 2010/0216912 A1 * | 8/2010 | Oka | C08L 63/00 |
| | | | 523/466 |
| 2010/0258713 A1 * | 10/2010 | Takahashi | H01L 27/14618 |
| | | | 250/239 |
| 2010/0305273 A1 * | 12/2010 | Schaefer | C08F 283/12 |
| | | | 525/100 |
| 2011/0000079 A1 * | 1/2011 | Fukumaru | H02K 1/2766 |
| | | | 29/598 |
| 2011/0224333 A1 * | 9/2011 | Kitagawa | C08G 73/0644 |
| | | | 523/466 |
| 2011/0241188 A1 | 10/2011 | Mizuno et al. | |
| 2011/0251305 A1 * | 10/2011 | Ueno | C08G 59/306 |
| | | | 523/429 |
| 2011/0311790 A1 * | 12/2011 | Okada | C09J 9/02 |
| | | | 428/209 |
| 2012/0135238 A1 | 5/2012 | Yoshinaga et al. | |
| 2012/0237830 A1 | 9/2012 | Yoshinaga et al. | |
| 2014/0327329 A1 * | 11/2014 | Kitada | C08G 59/621 |
| | | | 310/43 |

FOREIGN PATENT DOCUMENTS

| | | |
|---|---|---|
| CN | 101379682 A | 3/2009 |
| EP | 0350232 A2 | 1/1990 |
| EP | 1626065 A1 | 2/2006 |
| EP | 1921734 A1 | 5/2008 |
| JP | 11-98735 A | 4/1999 |
| JP | 2002-359942 A | 12/2002 |
| JP | 2003-199303 A | 7/2003 |
| JP | 2005-298765 A | 10/2005 |
| JP | 2005-304247 A | 10/2005 |
| JP | 2007-236020 A | 9/2007 |
| JP | 2009-13213 A | 1/2009 |
| JP | 2010-159400 A | 7/2010 |
| JP | 2010-187535 A | 8/2010 |
| KR | 2009-0104138 A | 10/2009 |
| RU | 2265907 C2 | 12/2005 |
| SU | 724095 A1 | 3/1980 |
| SU | 1356121 A1 | 11/1987 |
| SU | 1656635 A1 | 6/1991 |

OTHER PUBLICATIONS

Singhal et al., Oscillating Disc Rheometer, Nov. 2003, Future Foundation.*
Office Action dated Nov. 3, 2014, in Chinese Patent Application No. 201180042391.8.
International Search Report, dated Sep. 27, 2011, issued in PCT/JP2011/004789.
Decision of Grant (including an English translation thereof) issued in the corresponding Russian Patent Application No. 2013114483 on Sep. 28, 2015.
Office Action dated Jun. 10, 2014, in Korean Patent Application No. 10-2013-7007257.

* cited by examiner

[Fig.1]
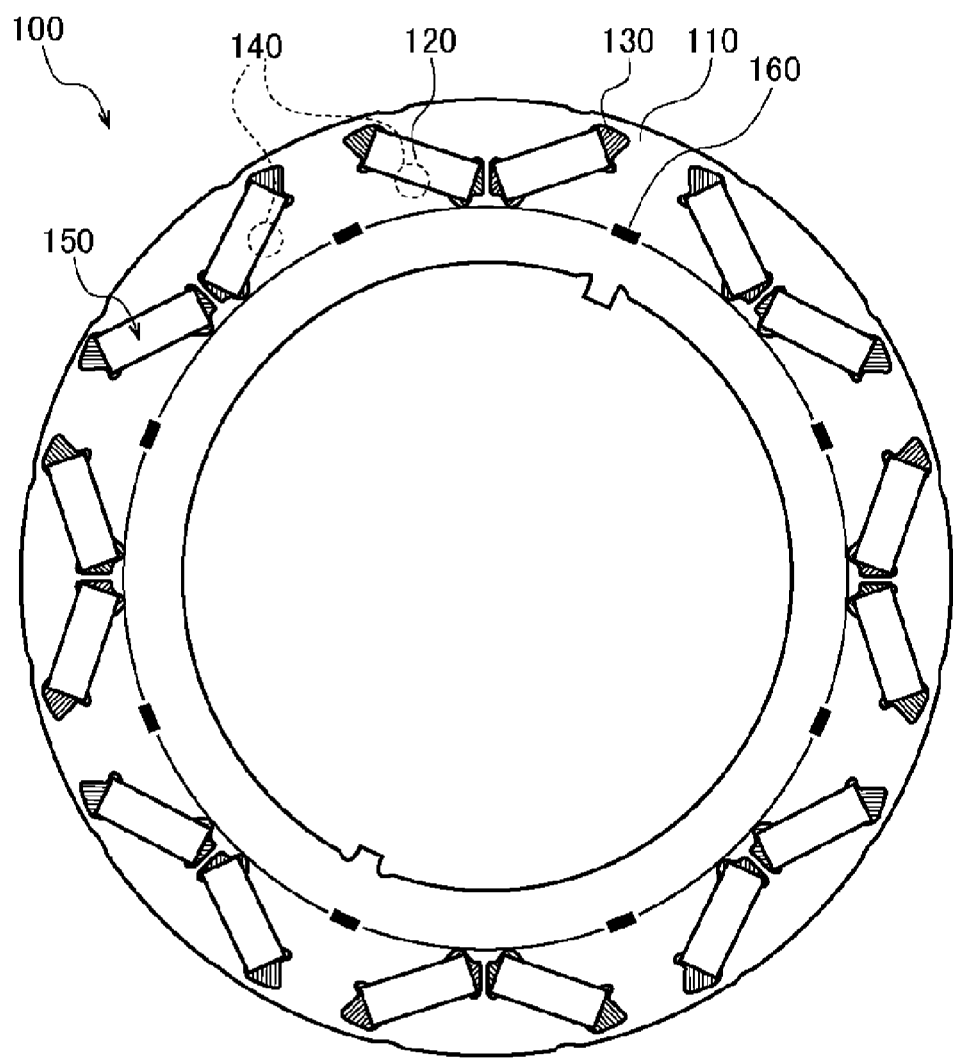

[Fig.2]
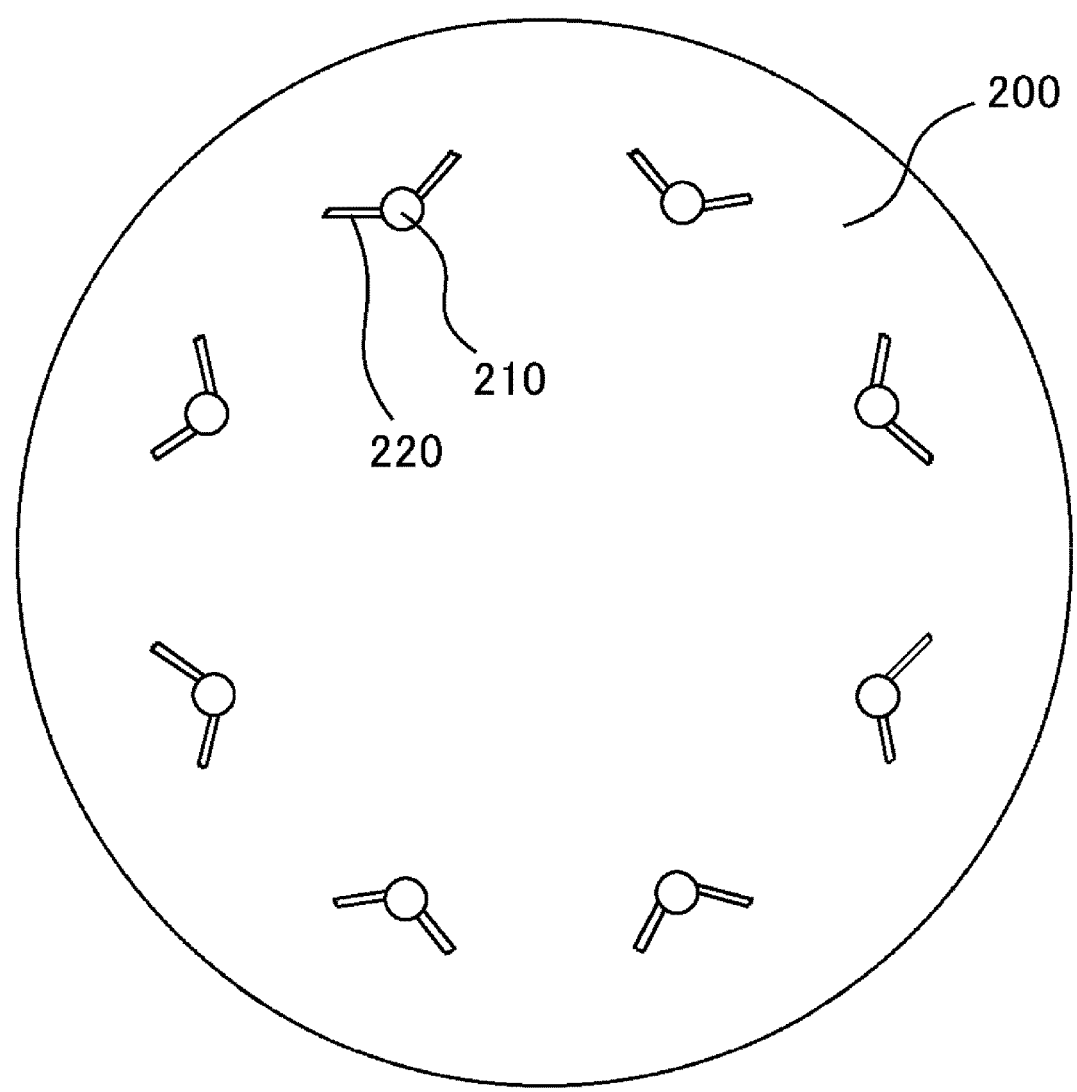

[Fig.3]
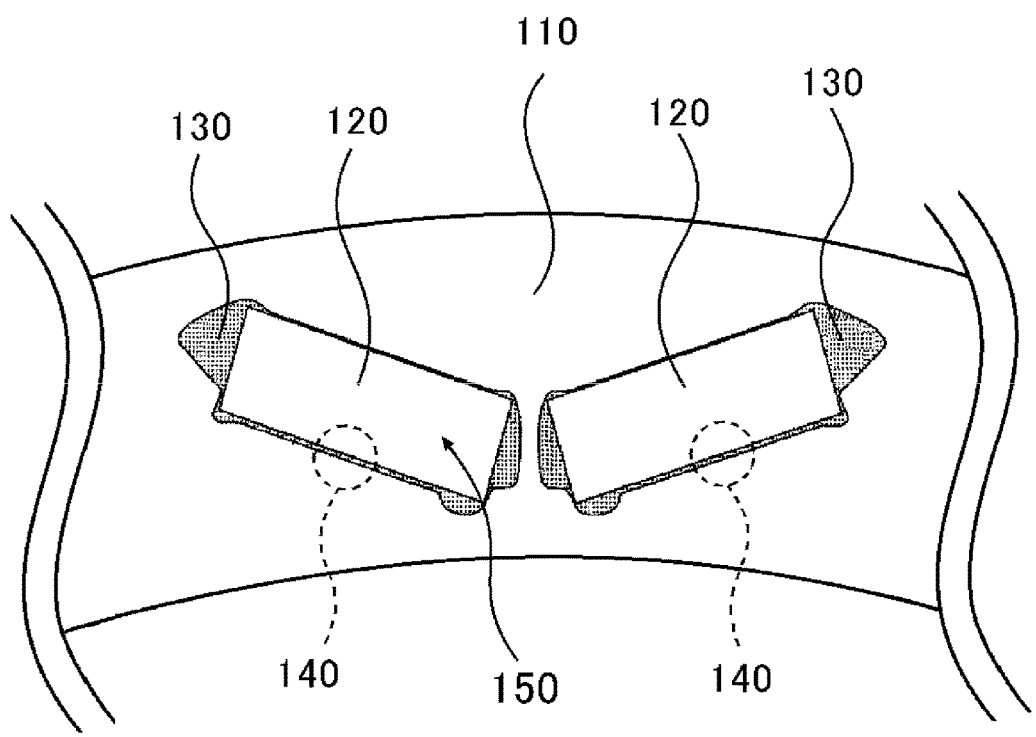

[Fig.4]
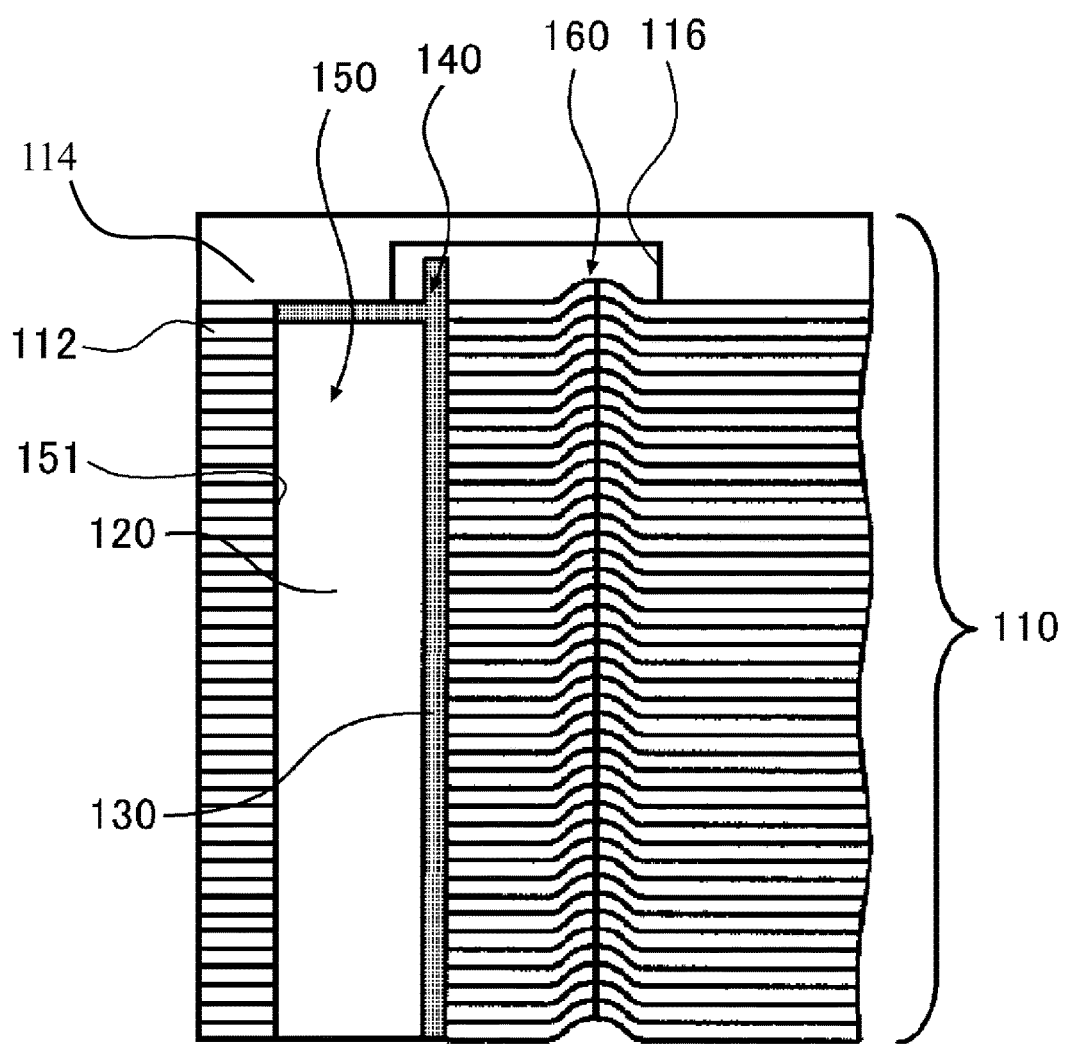

[Fig.5]
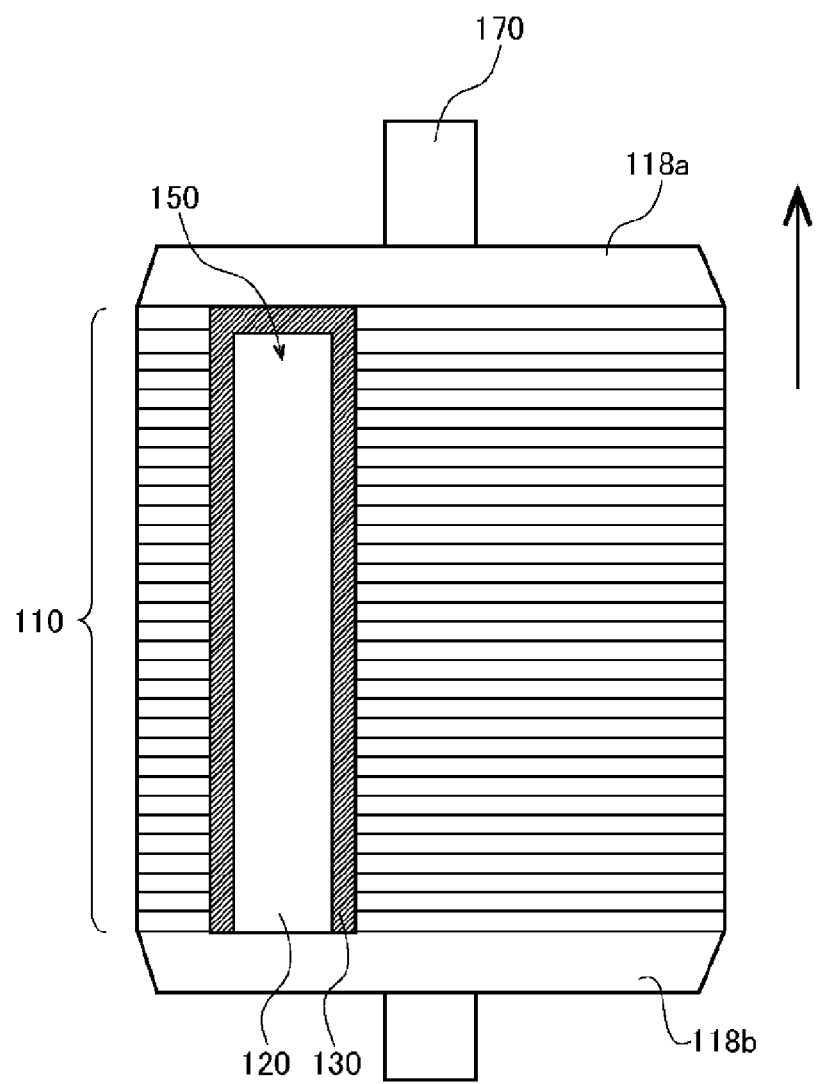

[Fig.6]
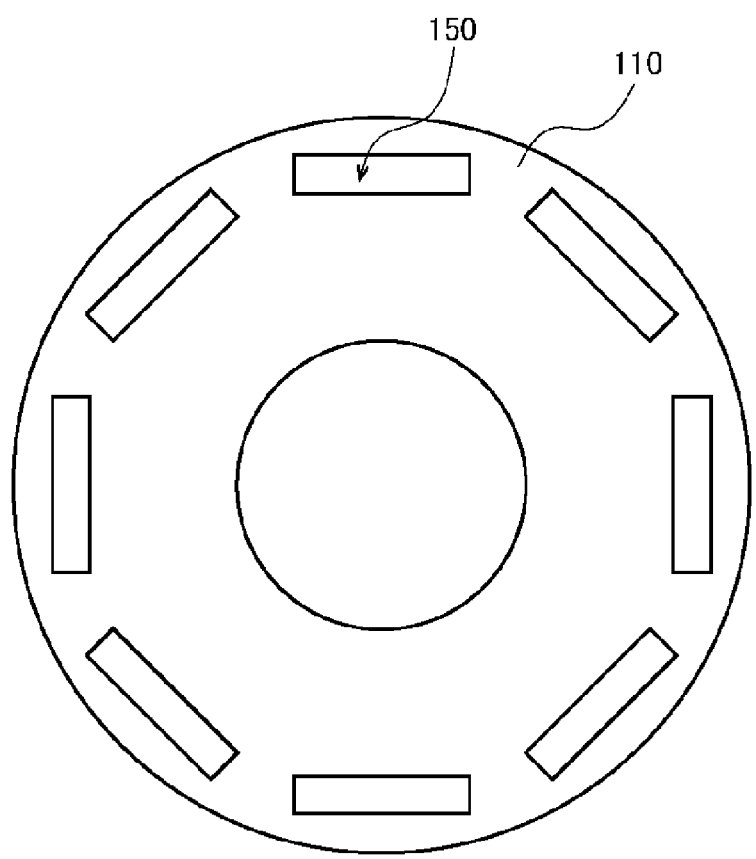

[Fig.7]
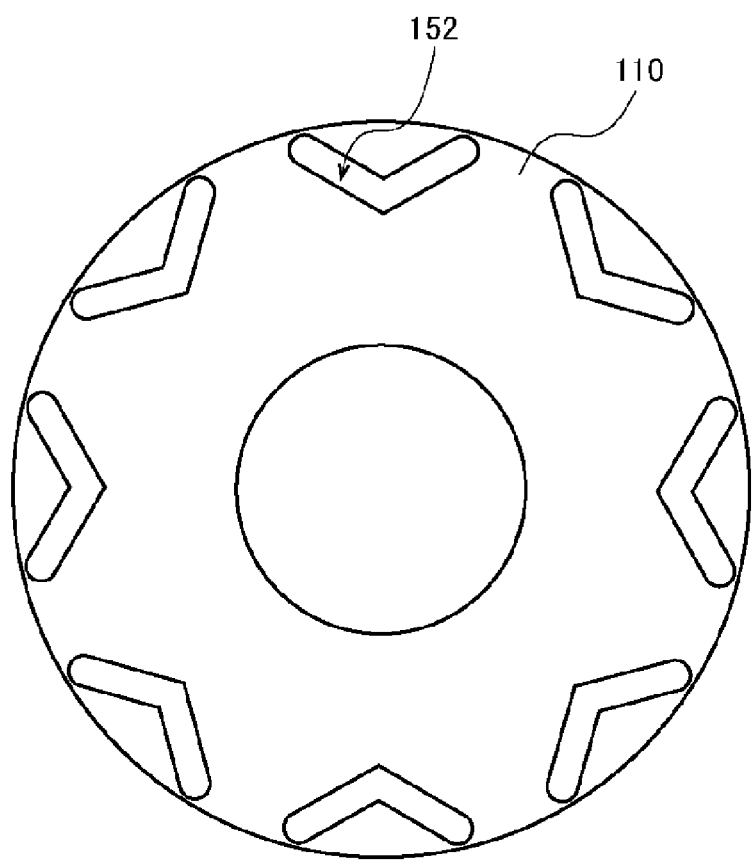

[Fig.8]
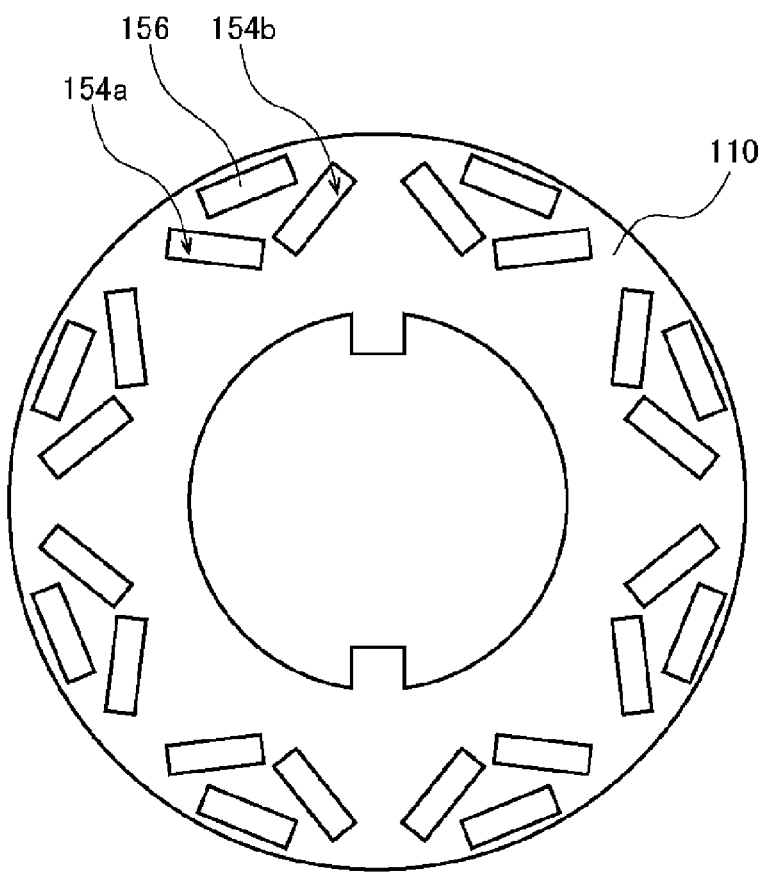

FIXING RESIN COMPOSITION FOR USE IN ROTOR

TECHNICAL FIELD

The present invention relates to a fixing resin composition for a use in a rotor.

BACKGROUND ART

Recently, in the art of rotors, techniques in which a permanent magnet is inserted into a hole portion provided in a rotor core and a liquid resin is filled between the hole portion and the permanent magnet to fix the permanent magnet to the rotor core have been used. In such a technical field, a urethane resin, an epoxy resin, and the like are usually employed as a liquid resin. This technology is described in, for example, Patent Document 1.

Furthermore, in Patent Document 2, an epoxy resin for encapsulating a motor, which is used for encapsulating a motor, and a molded article formed by curing the same are described. It is described that working environment properties, productivity, heat resistance, heat conductivity, solvent resistance, high humidity water resistance, and a low linear expansion coefficient are attained in the molded article. For this reason, it is thought that the molded article described in Patent Document 2 is used for a housing of a motor.

Moreover, the rotor described in Patent Document 3 has a structure where a second hole portion communicating with a first hole portion and positioning along the rotation direction of the rotor is formed on the side of the first hole portion accommodating a permanent magnet. By filling a resin or disposing a spring in the second hole portion, a stress that the permanent magnet gets from the side wall of the first hole portion in the rotation direction of the rotor is reduced, which is described to be capable of preventing cracking of the permanent magnet. In the same document, it is described that an epoxy resin that is filled with silica can be employed as a resin, but any specific amounts of silica filled is not described. In addition, in the same document, a technique for filling a resin in a hole portion has not been described.

Incidentally, as a technique for filling a liquid resin between the hole portion and the magnet of the rotor core, there exist two techniques, a first-in technique and a coating technique. The first-in technique has the following steps. First, a liquid resin is filled into a hole portion of a rotor core by a dispenser. Thereafter, a magnet is inserted into the hole portion filled with the liquid resin. The first-in technique is described in Patent Documents 4 and 5. On the other hand, the coating method has the following steps. First, the magnet is coated with the liquid resin with a brush. The magnet coated with the liquid resin is inserted into the hole portion of the rotor core. The coating method is described in Patent Document 6.

RELATED DOCUMENT

Patent Document

[Patent Document 1] Japanese Unexamined Patent Application Publication No. 2007-236020
[Patent Document 2] Japanese Unexamined Patent Application Publication No. 2009-13213
[Patent Document 3] Japanese Unexamined Patent Application Publication No. 2002-359942
[Patent Document 4] Japanese Unexamined Patent Application Publication No. 2005-304247
[Patent Document 5] Japanese Unexamined Patent Application Publication No. H11-98735
[Patent Document 6] Japanese Unexamined Patent Application Publication No. 2003-199303

DISCLOSURE OF THE INVENTION

However, in the above-described technology, a liquid resin is used, and thus, there is still a room for improvement of the mechanical strength of a resin for fixing a permanent magnet. Further, the epoxy resin described in Patent Document 2 is intended to cover the entire motor. Therefore, it is difficult to use the resin described in Patent Document 2 for the purpose of fixing the permanent magnet.

Furthermore, in Patent Document 3, a technique for filling a resin between the hole portion of the rotor core and the magnet is not clearly described. However, based on the common general knowledge at the time of filing the Patent Document 3 and the filling techniques described in Patent Documents 4 to 6, it can be said that the filling method described in Patent Document 3 employs a technique for filling a liquid resin. In addition, in Patent Document 3, neither a jig for filling a solid resin or a filling method using the jig nor an object of employing a liquid resin is described.

Here, although any one of the methods for filling a liquid resin as described in Patent Documents 4 to 6 is used as the method for filling the resin as described in Patent Document 3, it is commonly thought that a liquid resin added with an excess amount of silica cannot be filled well in the case of adding 50% by mass of silica to the liquid resin.

Therefore, even when silica is added, it is commonly thought that the addition amount of silica is at most equal to or less than 10% by mass, based on the entire liquid resin.

Accordingly, the present inventors have studied, and as a result, they have found that the decrease in the filling properties of a resin containing an inorganic filler can be inhibited while increasing the content of the inorganic filler up to equal to or more than 50% by mass based on the entire resin, by appropriately selecting a molding method such as insert molding.

The present invention relates to the following.

[1]

A fixing resin composition used for forming a fixing member in a rotor provided with a rotor core fixed and installed on a rotating shaft, in which a plurality of hole portions arranged along the peripheral portion of the rotating shaft are formed, a magnet inserted in the hole portion, and the fixing member provided in a separation portion between the hole portion and the magnet, wherein the fixing resin composition includes a thermosetting resin (A) containing an epoxy resin, a curing agent (B), and an inorganic filler (C), and the content of the inorganic filler (C) is equal to or more than 50% by mass, based on 100% by mass of the total content of the fixing resin composition.

[2]

The fixing resin composition as described in [1], which is in the powder, granule, or tablet shape.

According to the present invention, a rotor having excellent mechanical strength is provided.

BRIEF DESCRIPTION OF THE DRAWINGS

The above-described objects, and other objects, features, and advantages become more apparent with reference to suitable embodiments as mentioned later and the accompanying drawings below.

FIG. 1 is a top view schematically showing the rotor according to the embodiment of the present invention.

FIG. 2 is a top view schematically showing the mold for insert molding according to the embodiment of the present invention.

FIG. 3 is an enlarged view schematically showing a part of the rotor according to the embodiment of the present invention.

FIG. 4 is a cross-sectional view schematically showing a part of the rotor according to the embodiment of the present invention.

FIG. 5 is a cross-sectional view schematically showing the rotor according to the embodiment of the present invention.

FIG. 6 is a top view schematically showing the rotor according to a modification example.

FIG. 7 is a top view schematically showing the rotor according to a modification example.

FIG. 8 is a top view schematically showing the rotor according to a modification example.

DESCRIPTION OF EMBODIMENTS

Hereinafter, the embodiments of the present invention will be described with reference to the drawings. Incidentally, in all the drawings, the same reference numerals are attached to the same components and explanation thereof will not be repeated as appropriate.

FIG. 1 is a top view of the rotor according to the embodiment of the present invention. FIG. 3 is an enlarged view of a part of the rotor according to the embodiment of the present invention. FIG. 4 is a cross-sectional view of a part of the rotor according to the embodiment of the present invention.

The rotor 100 of the present embodiment includes a rotor core 110, fixed and installed on a rotating shaft (shaft 170), in which a plurality of hole portions 150 arranged along the peripheral portion of the rotating shaft are formed, a magnet 120 inserted in the hole portion 150, and a fixing member 130 formed by curing a fixing resin composition filled between the hole portion 150 and the magnet 120.

The rotor core 110 is formed by laminating a plurality of electromagnetic steel plates (steel plates 112) which are magnetic bodies in the thin plate shape. In the rotor core 110, a through hole for inserting the shaft 170 is provided. This rotor core 110 may be in the cylindrical shape, for example. The shape seen from the upper surface of the rotor core 110 is not particularly limited, but may be, for example, circular, polygonal, or the like. In addition, a plurality of electromagnetic steel plates are joined to each other by a caulking portion 160. Further, the electromagnetic steel plate is constituted with, for example, iron and iron alloys. In addition, an end plate 114 is provided in the end portion in the axial direction of the rotor core 110. In addition, grooves 116 for avoiding interference with the caulking portion 160 and the opening portion of the filling portion 140, may be formed in the end plate 114.

A plurality of hole portions 150 (or a hole portion group constituted with a plurality of hole portions) are arranged in the rotor core 110 to build point symmetry around the center of the axial core of the rotating shaft. The number of the hole portions 150 is not particularly limited, but it is, for example, $2^n$ or $3^n$ (wherein n is a natural number, for example, in the range from 2 to 5). The magnet 120 is inserted into the respective hole portions 150. The hole portions 150 may be configured to conform the shape of the magnet 120 and may have a margin (gap portion) around the magnet 120, for example.

The arrangement layout of the hole portions 150 is not limited to the embodiment shown in FIG. 1, and any of various arrangement layouts shown in FIGS. 6 to 8 may be employed. One hole portion group including two or three hole portions 150 may be arranged along the peripheral portion of the rotating shaft. The respective hole portion groups are separated from each other and may be constituted with two hole portions (hole portions 150 or hole portions 154a and 154b) arranged in the V shape. Further, as shown in FIG. 8, the hole portion group may be constituted with the hole portions 154a and 154b, and the hole portions 156 formed between these hole portions 154a and 154b. Also, as shown in FIG. 7, the hole portions arranged in the V shape may be communicated to form one hole portion 152. In addition, as shown in FIG. 6, the arrangement layout of the hole portions 150 may be such that the hole portions 150 are arranged to be separated from each other in the direction orthogonal to the direction perpendicular to the shaft surface.

The magnet 120 is fixed to the side wall 151 of the hole portions 150 on the outer peripheral side of the rotor core 110. That is, the fixing resin composition according to the present invention is filled in the separation portion (filling portion 140) between a side wall other than the side wall 151 of the hole portions 150 on the inner peripheral side of the rotor core 110 and the magnet 120, and the fixing resin composition may be cured to form the fixing member 130. Here, for example, a permanent magnet such as a neodymium magnet may be used as the magnet 120.

As shown in FIG. 5, the end plates 118a and 118b may be fixed by welding or the like to the shaft 170. Further, in the hole portions 150, the fixing member 130 may not be formed on the side wall of the magnet 120 on the outer peripheral side, but as shown in FIG. 5, the fixing member 130 may be formed on both side walls of the magnet 120 on the outer peripheral side and the inner peripheral side.

Hereinbelow, the respective components of the fixing resin composition constituting the rotor 100 of the present invention will be described.

The fixing resin composition of the present invention is solid and is used for formation of rotors or vehicles which are provided with rotors. That is, the fixing resin composition is used for fixing a magnet arranged in the hole portions formed in the rotor core constituted with an electromagnetic steel plate.

(Fixing Resin Composition)

The fixing resin composition according to the present invention includes a thermosetting resin (A) containing an epoxy resin, a curing agent (B), and an inorganic filler (C).

[Thermosetting Resin (A)]

First, the thermosetting resin (A) will be described.

The thermosetting resin (A) is not particularly limited, but an epoxy resin (A1), a phenolic resin, an oxetane resin, a (meth)acrylate resin, an unsaturated polyester resin, a diallyl phthalate resin, a maleimide resin, or the like is used. Among these, the epoxy resin (A1), which is excellent in curability, storability, and heat resistance, moisture resistance and chemical resistance of a cured product, is suitably used.

The thermosetting resin (A) according to the present invention preferably contains an epoxy resin (A1). This epoxy resin (A1) is not particularly limited in molecular weights or structures as long as it has two or more epoxy groups in one molecule. Examples thereof include novolac type phenolic resins such as a phenol novolac resin, a cresol novolac resin, and a bisphenol A novolac resin; phenolic resins such as a resol type phenolic resin; novolac type epoxy resins such as a phenol novolac type epoxy resin and a cresol novolac type epoxy resin; bisphenol type epoxy resins such as a bisphenol A type epoxy resin and a bisphenol F type epoxy resin; aromatic glycidylamine type epoxy resins such as N,N-diglycidylaniline, N,N-diglycidyltoluidine, diaminodiphenylmethane type glycidylamine, and aminophenol type glycidylamine; a hydroquinone type epoxy resin, a biphenyl type epoxy resin, a stilbene type epoxy resin, a triphenolmethane type epoxy resin, a triphenolpropane type epoxy resin, an alkyl modified triphenolmethane type epoxy resin, a triazine nucleus-containing epoxy resin, a dicyclopentadiene modified phenol type epoxy resin, a naphthol type epoxy resin, a naphthalene type epoxy resin, aralkyl type epoxy resins such as a phenolaralkyl type epoxy resin having a phenylene skeleton and/or a biphenylene skeleton, and a naphthol aralkyl type epoxy resin having a phenylene skeleton and/or a biphenylene skeleton; and aliphatic epoxy resins such as vinylcyclohexene dioxide, dicyclopentadiene oxide, and alicyclic epoxy such as alicyclic diepoxyadipate. These may be used singly or may be used in combination of two or more kinds thereof.

In this case, it is preferable to contain the aromatic ring coupled with a glycidyl ether structure or a glycidyl amine structure, from the viewpoints of heat resistance, mechanical properties, and moisture resistance.

The content of the thermosetting resin (A) according to the present invention is not particularly limited, but is preferably equal to or more than 5% by mass and equal to or less than 40% by mass, and more preferably equal to or more than 10% by mass and equal to or less than 20% by mass, based on 100% by mass of the total content of the fixing resin composition.

In a preferred embodiment including the epoxy resin (A1) according to the present invention, the lower limit of the content of the epoxy resin is not particularly limited, but is preferably equal to or more than 70% by mass and equal to or less than 100% by mass, and more preferably equal to or more than 80% by mass and equal to or less than 100% by mass, based on 100% by mass of the thermosetting resin (A).

[Curing Agent (B)]

Next, the curing agent (B) will be described. The curing agent (B) is the one used for dimensionally bridging the epoxy resin (A1) included in the thermosetting resin (A) and is not particularly limited, and examples thereof may include a phenolic resin. The phenolic resin-based curing agents include all of monomers, oligomers and polymers, each having two or more phenolic hydroxyl groups in one molecule. There are no particular limitations on their molecular weights and the molecular structures, but examples of the phenolic resin-based curing agents include novolac type resins such as a phenol novolac resin, a cresol novolac resin, and a naphthol novolac resin; polyfunctional type phenolic resins such as a triphenolmethane type phenolic resin; modified phenolic resins such as a terpene modified phenolic resin and a dicyclopentadiene modified phenolic resin; aralkyl type resins such as a phenol aralkyl resin having a phenylene skeleton and/or a biphenylene skeleton, and a naphthol aralkyl resin having a phenylene skeleton and/or a biphenylene skeleton; and bisphenol compounds such as bisphenol A and bisphenol F. These may be used singly or may be used in combination of two or more kinds thereof. These phenolic resin-based curing agents are preferred from the viewpoint of achieving a balance between flame resistance, moisture resistance, electrical properties, curability, storage stability, and the like. In particular, in term of curability, the equivalents of the hydroxyl groups in the phenolic resin-based curing agent may be, for example, equal to or more than 90 g/eq and equal to or less than 250 g/eq.

In the present embodiment, the method for measuring flame resistance is as follows: The fixing resin composition is injection-molded under the conditions of a mold temperature of 175° C., an injection pressure of 9.8 MPa, an injection time of 15 seconds, and a curing time of 120 seconds, using a molding machine (KTS-30, manufactured by Kohtaki Precision Machine Co., Ltd.), whereby a flame-resistant test piece having 127 mm×12.7 mm×thickness of 3.2 mm is prepared. The test piece is subjected to a flame resistance test in accordance with a standard specified in the UL-94 vertical method to determine the flame resistance.

Usually, for the rotors of vehicles, a fixing resin composition showing entire burning of the flame resistant rank can be used. According to the environments where the vehicles are used, for the rotors of vehicles, a fixing resin composition exhibiting a flame resistance rank of V-0 may be used.

Further, examples of the curing agent used in combination with others include a polyaddition type curing agent, a catalyst type curing agent, and a condensation type curing agent.

Examples of the polyaddition type curing agent include polyamine compounds including aliphatic polyamines such as diethylenetriamine (DETA), triethylenetetramine (TETA), and methaxylenediamine (MXDA), aromatic polyamines such as diaminodiphenylmethane (DDM), m-phenylenediamine (MPDA), and diaminodiphenylsulfone (DDS), as well as dicyandiamides (DICY) and organic acid dihydrazides; acid anhydrides including alicyclic acid anhydrides such as hexahydrophthalic anhydride (HHPA) and methyltetrahydrophthalic anhydride (MTHPA), and aromatic acid anhydrides such as trimellitic anhydride (TMA), pyromellitic anhydride (PMDA), and benzophenonetetracarboxylic acid (BTDA); polyphenol compounds such as novolac type phenolic resins, and phenol polymers; polymercaptan compounds such as polysulfides, thio esters, and thioethers; isocyanate compounds such as isocyanate prepolymers and blocked isocyanates; and organic acids such as carboxylic acid-containing polyester resins.

Examples of the catalyst type curing agent include tertiary amine compounds such as benzyldimethylamine (BDMA) and 2,4,6-trisdimethylaminomethylphenol (DMP-30); imidazole compounds such as 2-methylimidazole and 2-ethyl-4-methylimidazole (EMI24); and Lewis acids such as a BF3 complex.

Examples of the condensation type curing agent include resol resins, urea resins such as a methylol group-containing urea resin; and melamine resins such as a methylol group-containing melamine resin.

In the case of using such other curing agents in combination with others, the lower limit of the content of the phenolic resin-based curing agent is preferably, equal to or more than 20% by mass, more preferably equal to or more than 30% by mass, and particularly preferably equal to or more than 50% by mass, based on the entire curing agent (B). When the blending ratio is within the above range, the good flowability can be exhibited while maintaining flame resistance. In addition, the upper limit of the content of the phenolic resin-based curing agent is not particularly limited, but is preferably equal to or less than 100% by mass, based on the entire curing agent (B).

The lower limit of the content of the curing agent (B) in the fixing resin composition according to the present invention is not particularly limited, but is preferably equal to or more than 0.8% by mass, and more preferably equal to or more than 1.5% by mass, based on 100% by mass of the total content of the fixing resin composition. If the lower limit of the blending ratio is within the above range, good curability is obtained. Further, the upper limit of the content of the curing agent (B) in the fixing resin composition according to the present invention is also not particularly limited, but is preferably equal to or less than 12% by mass, and more preferably equal to or less than 10% by mass, based on 100% by mass of the total content of the fixing resin composition.

Incidentally, it is preferable that the phenolic resin as the curing agent (B) and the epoxy resin be mixed such that the equivalent ratio (EP)/(OH) of the number of epoxy groups (EP) in the total thermosetting resin (A) to the number of phenolic hydroxyl groups (OH) on the entire phenolic resin is equal to or more than 0.8 and equal to or less than 1.3. When the equivalent ratio is within the above range, sufficient curing properties may be obtained during molding of the obtained fixing resin composition. However, in the case of using resins other than the phenolic resins that can be reacted with the epoxy resins, the equivalent ratio may be adjusted appropriately.

[Inorganic Filler (C)]

As the inorganic filler (C) for use in the fixing resin composition according to the present invention, inorganic fillers that are generally used in the technical field of fixing resin compositions can be used. Examples thereof include fused silica such as fused crushed silica and fused spherical silica; crystalline silica, alumina, kaolin, talc, clay, mica, rock wool, wollastonite, glass powder, glass flakes, glass beads, glass fibers, silicon carbide, silicon nitride, aluminum nitride, carbon black, graphite, titanium dioxide, calcium carbonate, calcium sulfate, barium carbonate, magnesium carbonate, magnesium sulfate, barium sulfate, cellulose, aramid, wood, and pulverized powder obtained by pulverizing the cured products of phenolic resin molding materials or epoxy resin molding materials. Among these, silica such as fused crushed silica, fused spherical silica, and crystalline silica can be preferably used, and fused spherical silica can be more preferably used. Further, among these, calcium carbonate is preferred in terms of cost. The inorganic filler (C) may be used singly or in combination of two or more kinds thereof.

The average particle diameter $D_{50}$ of the inorganic filler (C) is preferably equal to or more than 0.01 μm and equal to or less than 75 μm, and more preferably equal to or more than 0.05 μm and equal to or less than 50 μm. By setting the average particle diameter of the inorganic filler (C) within the above range, the fillability into the separation portion (filling portion) between the hole portion and the magnet is improved. Further, by setting the upper limit of the average particle diameter of the inorganic filler (C) to upper limit equal to or less than 75 μm, the fillability is further improved.

The average particle diameter $D_{50}$ is defined as a volume conversion average particle diameter by a RODOS SR type laser diffraction measurement device (SYMPATEC HEROS&RODOS).

Furthermore, in the fixing resin composition according to the present invention, the inorganic filler (C) may contain two or more kinds of spherical silica having different average particle diameters $D_{50}$. By this, both improvement of flowability and fillability and inhibition of burring can be satisfied.

The content of the inorganic filler (C) is preferably equal to or more than 50% by mass, more preferably equal to or more than 60% by mass, even more preferably equal to or more than 65% by mass, and particularly preferably equal to or more than 75% by mass, based on 100% by mass of the total content of the fixing resin composition. When the lower limit is within the above range, an increase in the moisture absorption and a decrease in the strength, accompanied by curing of the obtained fixing resin composition, can be reduced. Further, the amount of the inorganic filler (C) is preferably equal to or less than 93% by mass, more preferably equal to or less than 91% by mass, and even more preferably equal to or less than 90% by mass, based on 100% by mass of the total content of the fixing resin composition. If the upper limit is within the above range, the obtained fixing resin composition has good flowability as well as good moldability. Therefore, the preparation stability of the rotor increases, and thus, a rotor having excellent balance between yield and durability is obtained.

Furthermore, the present inventor has investigated, and as a result, by setting the content of the inorganic filler (C) to equal to or more than 50% by mass, the difference in linear expansions between the fixing member and the electromagnetic steel plate decreases, and thus, it is proved that at varying temperatures, the modification of electromagnetic steel plate and the deterioration of the rotation properties of the rotor are inhibited. Therefrom, a rotor having excellent duration of the rotation properties, in particular, among the durability, is achieved.

Moreover, in the case where silica such as fused crushed silica, fused spherical silica, and crystalline silica is used as the inorganic filler (C), the content of the silica is preferably equal to or more than 40% by mass, and more preferably equal to or more than 60% by mass, based on 100% by mass of the total content of the fixing resin composition. If the lower limit is within the above range, a good balance between the flowability and the thermal expansion rate is obtained.

Incidentally, in the case where a metal hydroxide such as aluminum hydroxide and magnesium hydroxide, or an inorganic flame retardant such as zinc borate, zinc molybdate, and antimony trioxide, as described below, is used in combination with the inorganic filler (C), the total amount of the inorganic flame retardant and the inorganic filler is preferably within the above range of the content of the inorganic filler (C).

[Other Components]

The fixing resin composition according to the present invention may include a curing accelerator (D). The curing accelerator (D) may be any one which promotes the reaction between an epoxy group of the epoxy resin and a hydroxyl group of the phenolic resin-based curing agent (B), and a curing accelerator (D) generally used can be used.

Specific examples of the curing accelerator (D) include phosphorous atom-containing compounds such as an organic phosphine, a tetra-substituted phosphonium compound, a phosphobetaine compound, an adduct of a phosphine compound and a quinone compound, and an adduct of a phosphonium compound and a silane compound; and nitrogen-containing compounds, typically such as amidine-based compounds such as 1,8-diazabicyclo(5,4,0) undecene-7 and imidazole, tertiary amines such as benzyldimethylamine, and amidinium salts or ammonium salts, that are quaternary onium salts of the above compounds. Among these, phosphorous atom-containing compounds are preferred from the viewpoint of curability; curing accelerators having latency such as a tetra-substituted phosphonium compound, a phosphobetaine compound, an adduct of a phosphine compound and a quinone compound, and an adduct of a phosphonium compound and a silane compound are more preferred from the viewpoint of a balance between flowability and curability; and a tetra-substituted phosphonium compound is particularly preferred in view of flowability; a phosphobetaine compound, and an adduct of a phosphine compound and a quinone compound is particularly preferred from the viewpoint of soldering resistance; an adduct of a phosphonium compound and a silane compound is particularly preferred from the viewpoint of latent curability; a tetra-substituted phosphonium compound is preferred from the viewpoint of continuous moldability; and an organic phosphine and a nitrogen atom-containing compound are also suitably used in view of cost.

Examples of the organic phosphine which may be used for the fixing resin composition according to the present invention include primary phosphines such as ethylphosphine and phenylphosphine; secondary phosphines such as dimethylphosphine and diphenylphosphine; and tertiary phosphines such as trimethylphosphine, triethylphosphine, tributylphosphine and triphenylphosphine.

Examples of the tetra-substituted phosphonium compound which may be used for the fixing resin composition according to the present invention include compounds represented by the following general formula (1).

[Chemical formula 1]

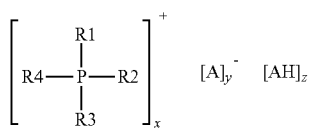

(1)

In the general formula (1), P represents a phosphorus atom; R1, R2, R3, and R4 each independently represents an aromatic group or an alkyl group; A represents an anion of an aromatic organic acid in which at least one functional group selected from a hydroxyl group, a carboxyl group, and a thiol group is contained in an aromatic ring; AH represents an aromatic organic acid in which at least one functional group selected from a hydroxyl group, a carboxyl group, and a thiol group is contained in an aromatic ring; x and y are each an integer of 1 to 3; z is an integer of 0 to 3; and x=y.

The compound represented by the general formula (1) is obtained, for example, in the following manner, but the method is not limited thereto. First, a tetra-substituted phosphonium halide, an aromatic organic acid, and a base are added to an organic solvent and uniformly mixed to produce an aromatic organic acid anion in the solution system. Subsequently, water is added to the solution, and thus the compound represented by the general formula (1) may be precipitated. In the compound represented by the general formula (1), R1, R2, R3, and R4 bonded to a phosphorus atom are each preferably a phenyl group, AH is preferably a compound having a hydroxyl group on its aromatic ring, that is, a phenol compound, and A is preferably an anion of the phenol compound, each from the viewpoint of an excellent balance of the yield during the synthesis and the curing promoting effect. Further, the phenol compound includes, within its concept, monocyclic phenol, cresol, cathecol, resorcin, fused polycyclic naphthol, dihydroxynaphthalene, bisphenol A, bisphenol F, bisphenol S, biphenol, phenylphenol, phenol novolac, and the like, which include a plurality of aromatic rings (polycyclic), and among these, a phenol compound having two hydroxyl groups are preferably used.

Examples of the phosphobetaine compound which may be used for the fixing resin composition according to the present invention include compounds represented by the following general formula (2).

[Chemical formula 2]

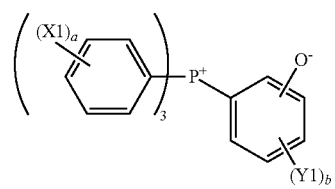

(2)

In the general formula (2), X1 represents an alkyl group having 1 to 3 carbon atoms; Y1 represents a hydroxyl group; a is an integer of 0 to 5; and b is an integer of 0 to 4.

The compound represented by the general formula (2) is obtained, for example, in the following manner. First, it is obtained through a step in which a triaromatic-substituted phosphine, which is a tertiary phosphine, is brought into contact with a diazonium salt to substitute the triaromatic-substituted phosphine and a diazonium group of the diazonium salt. However, the method is not limited to this.

Examples of the adduct of a phosphine compound and a quinone compound which may be used for the fixing resin composition according to the present invention include compounds represented by the following general formula (3).

[Chemical formula 3]

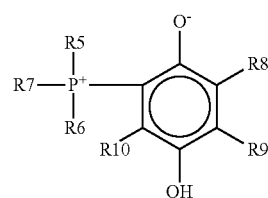

(3)

In the above general formula (3), P represents a phosphorus atom; R5, R6 and R7 each independently represents an alkyl group having 1 to 12 carbon atoms or an aryl group having 6 to 12 carbon atoms; R8, R9, and R10 each independently represent a hydrogen atom or a hydrocarbon group having 1 to 12 carbon atoms; and R8 and R9 may be bonded to each other to form a cyclic structure.

Preferable examples of the phosphine compound used for the adduct of a phosphine compound and a quinone compound include phosphines such as triphenylphosphine, tris(alkylphenyl)phosphine, tris(alkoxyphenyl)phosphine, trinaphthylphosphine, and tris(benzyl)phosphine; which contains an unsubstituted aromatic ring or an aromatic ring substituted with an alkyl group or an alkoxy group. Examples of the substituent of the alkyl group and the alkoxy group include ones having 1 to 6 carbon atoms. From the viewpoint of easy availability, triphenylphosphine is preferred.

Examples of the quinone compound used for the adduct of a phosphine compound and a quinone compound include o-benzoquinone, p-benzoquinone and anthraquinones.

Among these compounds, p-benzoquinone is preferred from the viewpoint of storage stability.

In a method for producing an adduct of a phosphine compound and a quinone compound, an organic tertiary phosphine is brought into contact with a benzoquinone in a solvent that can dissolve both the organic tertiary phosphine and the benzoquinone, and mixed to produce an adduct thereof. Any solvent can be used as long as the solubility into the adduct is low. Examples of the solvent include ketones such as acetone and methyl ethyl ketone, but are not limited thereto.

In the compound represented by the general formula (3), R5, R6, and R7, all of which are bonded to a phosphorus atom, are preferably a phenyl group, and R8, R9, and R10 are each preferably a hydrogen atom. That is, a compound produced by adding 1,4-benzoquinone to triphenylphosphine is preferred, because the compound decreases the elastic modulus during heating of a cured product of the fixing resin composition.

Examples of the adduct of a phosphonium compound and a silane compound which may be used for the fixing resin composition according to the present invention include compounds represented by the following general formula (4).

[Chemical formula 4]

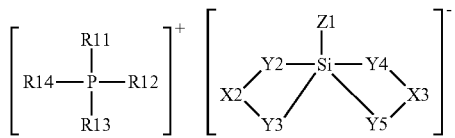

In the above general formula (4), P represents a phosphorus atom; Si represents a silicon atom; R11, R12, R13, and R14 each independently represent an organic group having an aromatic ring or a heterocycle, or an aliphatic group; X2 is an organic group that bonds to groups Y2 and Y3; X3 is an organic group that bonds to groups Y4 and Y5; Y2 and Y3 each independently represent a group formed when a proton-donating group releases a proton, and the groups Y2 and Y3 in the same molecule are bonded to the silicon atom to form a chelate structure; Y4 and Y5 each independently represent a group formed when a proton-donating group releases a proton, and the groups Y4 and Y5 in the same molecule are bonded to the silicon atom to form a chelate structure; X2 and X3 may be the same as or different from each other; Y2, Y3, Y4 and Y5 may be the same as or different from each other; and Z1 is an organic group having an aromatic ring or a heterocycle, or an aliphatic group.

Examples of R11, R12, R13, and R14 in the general formula (4) include a phenyl group, a methylphenyl group, a methoxyphenyl group, a hydroxyphenyl group, a naphthyl group, a hydroxynaphthyl group, a benzyl group, a methyl group, an ethyl group, an n-butyl group, an n-octyl group, and a cyclohexyl group. Among these, more preferably used are aromatic groups having a substituent and unsubstituted aromatic groups such as a phenyl group, a methylphenyl group, a methoxyphenyl group, a hydroxyphenyl group, and a hydroxynaphthyl group.

Furthermore, in the general formula (4), X2 is an organic group that bonds to Y2 and Y3. Similarly, X3 is an organic group that bonds to groups Y4 and Y5. Y2 and Y3 are each a group formed when a proton-donating group releases a proton, and the groups Y2 and Y3 in the same molecule are bonded to the silicon atom to form a chelate structure. Similarly, Y4 and Y5 are each a group formed when a proton-donating group releases a proton, and the groups Y4 and Y5 in the same molecule are bonded to the silicon atom to form a chelate structure. The groups X2 and X3 may be the same as or different from each other, and the groups Y2, Y3, Y4, and Y5 may be the same as or different from one another. The group represented by —Y2-X2-Y3- and the group represented by —Y4-X3-Y5- in the general formula (4) are each a group formed when a proton donor releases two protons. As the proton donor, an organic acid having at least two carboxyl groups or hydroxyl groups in the molecule is preferred, an aromatic compound having at least two carboxyl groups or hydroxyl groups on carbon constituting the aromatic ring is more preferred, and an aromatic compound having at least two hydroxyl groups on adjacent carbon constituting the aromatic ring is even more preferred. Examples thereof include catechol, pyrogallol, 1,2-dihydroxynaphthalene, 2,3-dihydroxynaphthalene, 2,2'-biphenol, 1,1'-bi-2-naphthol, salicylic acid, 1-hydroxy-2-naphthoic acid, 3-hydroxy-2-naphthoic acid, chloranilic acid, tannic acid, 2-hydroxybenzyl alcohol, 1,2-cyclohexanediol, 1,2-propanediol, and glycerin. Among these, catechol, 1,2-dihydroxynaphthalene and 2,3-dihydroxynaphthalene are more preferred from the viewpoint of a balance between high availability of raw materials and an curing promoting effect.

Furthermore, in the general formula (4), Z1 represents an organic group having an aromatic ring or a heterocycle, or an aliphatic group. Specific examples thereof include aliphatic hydrocarbon groups such as a methyl group, an ethyl group, a propyl group, a butyl group, a hexyl group, and an octyl group; aromatic hydrocarbon groups such as a phenyl group, a benzyl group, a naphthyl group, and a biphenyl group; and reactive substituents such as a glycidyloxypropyl group, a mercaptopropyl group, an aminopropyl group, and a vinyl group. Among these, a methyl group, an ethyl group, a phenyl group, a naphthyl group, and a biphenyl group are more preferred from the viewpoint of thermal stability.

In a method for producing an adduct of a phosphonium compound and a silane compound, a silane compound such as phenyltrimethoxysilane and a proton donor such as 2,3-dihydroxynaphthalene are added to methanol in a flask and dissolved. Next, a sodium methoxide-methanol solution is added dropwise thereto under stirring at room temperature. A solution prepared by dissolving a tetra-substituted phosphonium halide such as tetraphenyl phosphonium bromide in methanol in advance is added dropwise to the resulting reaction product under stirring at room temperature to precipitate crystals. The precipitated crystals are filtered, washed with water, and then dried in vacuum to obtain an adduct of a phosphonium compound and a silane compound. However, the method is not limited thereto.

The lower limit of the content of the curing accelerator (D) which may be used for the fixing resin composition according to the present invention is preferably equal to or more than 0.1% by mass, based on 100% by mass of the total content of the fixing resin composition. If the lower limit of the content of the curing accelerator (D) is within the above range, sufficient curability is obtained. Further, the upper limit of the content of the curing accelerator (D) is preferably equal to or less than 3% by mass, and more preferably equal to or less than 1% by mass, based on 100% by mass of the total value of the entire fixing resin composition. If the upper limit of the content of the curing accelerator (D) is within the above range, sufficient flowability is obtained.

In the fixing resin composition of the present invention, a compound (E) in which a hydroxyl group is bonded to each of two or more adjacent carbon atoms constituting an aromatic ring (hereinafter referred to as the "compound (E)") may be further included. For the compound (E) in which a hydroxyl group is bonded to each of two or more adjacent carbon atoms constituting an aromatic ring is used, even in the case of using a phosphorous atom-containing curing accelerator having no latency as the curing accelerator (D) for accelerating a crosslinking reaction between the epoxy resin (A1) and the phenolic resin-based curing agent (B), the reaction of the fixing resin composition during the melt kneading may be suppressed with the use of the compound (E), so that a fixing resin composition can be obtained stably. Furthermore, the compound (E) also has an effect of decreasing the melt viscosity of the fixing resin composition and increasing flowability. Examples of the compound (E) include a monocyclic compound represented by the following general formula (5), a polycyclic compound represented by the following general formula (6) and the like, and these compounds may have a substituent other than a hydroxyl group.

[Chemical formula 5]

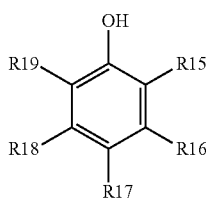

(5)

In the above general formula (5), either R15 or R19 is a hydroxyl group, when one of R15 and R19 is a hydroxyl group, the other is a hydrogen atom, a hydroxyl group or a substituent other than a hydroxyl group; and R16, R17, and R18 are each a hydrogen atom, a hydroxyl group or a substituent other than a hydroxyl group.

[Chemical formula 6]

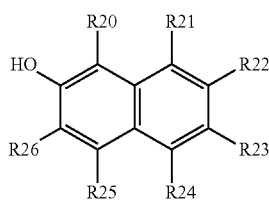

(6)

In the above general formula (6), either R20 or R26 is a hydroxyl group, when one of R20 and R26 is a hydroxyl group, the other is a hydrogen atom, a hydroxyl group or a substituent other than a hydroxyl group; and R21, R22, R23, R24, and R25 are each a hydrogen atom, a hydroxyl group, or a substituent other than a hydroxyl group.

Furthermore, specific examples of the monocyclic compound represented by the general formula (5) include catechol, pyrogallol, gallic acid, a gallic acid ester, and a derivative thereof. Further, specific examples of the polycyclic compound represented by the general formula (6) include 1,2-dihydroxynaphthalene, 2,3-dihydroxynaphthalene, and their derivatives. Among these compounds, from the viewpoint of ease of control of flowability and curability, preferred is a compound in which a hydroxyl group is bonded to each of two adjacent carbon atoms constituting an aromatic ring. Furthermore, in viewpoint of volatilization in a step of kneading, more preferably used is a compound having, as a mother nucleus, a naphthalene ring, which has low volatility and high weighing stability. In this case, the compound (E) may be specifically, for example, a compound having a naphthalene ring such as 1,2-dihydroxynaphthalene, 2,3-dihydroxynaphthalene and a derivative thereof. These compounds (E) may be used singly or may be used in combination of two or more kinds thereof.

The lower limit of the content of the compound (E) is equal to or more than 0.01% by mass, more preferably equal to or more than 0.03% by mass, and particularly preferably equal to or more than 0.05% by mass, based on 100% by mass of the entire fixing resin composition. If the lower limit of the content of the compound (E) is within the above range, the effects of sufficient low viscosity and improvement of flowability of the fixing resin composition are achieved. Further, the upper limit of the content of the compound (E) is equal to or less than 2% by mass, less preferably equal to or less than 0.8% by mass, and particularly preferably equal to or less than 0.5% by mass, based on 100% by mass of the entire fixing resin composition. If the upper limit of the content of the compound (E) is within the above range, there is little risk of reduction in curability and reduction in physical properties of curable products.

In the fixing resin composition according to the present invention, for the purpose of improving adhesion between the epoxy resin (A1) and the inorganic filler (C), a coupling agent (F) such as a silane coupling agent may be added. The coupling agent (F) is any one which undergoes a reaction between the epoxy resin (A1) and the inorganic filler (C) to improve the interfacial strength between the epoxy resin (A1) and the inorganic filler (C), and is not particularly limited. Examples thereof include epoxysilane, aminosilane, ureidosilane, and mercaptosilane. Further, when the coupling agent (F) may be used in combination with the above-stated compound (E) to enhance the effect of the compound (E) to reduce the melt viscosity of the fixing resin composition and improve flowability.

Examples of the epoxysilane include γ-glycidoxypropyltriethoxysilane, γ-glycidoxypropyltrimethoxysilane, γ-glycidoxypropylmethyldimethoxysilane, and β-(3,4-epoxycyclohexyl)ethyltrimethoxysilane. Further, examples of the aminosilane include γ-aminopropyltriethoxysilane, γ-aminopropyltrimethoxysilane, N-β(aminoethyl)γ-aminopropyltrimethoxysilane, N-β(aminoethyl)γ-aminopropylmethyldimethoxysilane, N-phenylγ-aminopropyltriethoxysilane, N-phenylγ-aminopropyltrimethoxysilane, N-β(aminoethyl)γ-aminopropyltriethoxysilane, N-6-(aminohexyl)-3-aminopropyltrimethoxysilane, and N-(3-(trimethoxysilylpropyl)-1,3-benzenedimethanane. Further, examples of the ureidosilane include γ-ureidopropyltriethoxysilane and hexamethyldisilazane. A product formed by reacting the primary amino site of aminosilane with ketones or aldehydes may be used as a latent aminosilane coupling agent. Further, the aminosilane may have secondary amino group. Further, examples of the mercaptosilane include, in addition to γ-mercaptopropyltrimethoxysilane and 3-mercaptopropylmethyldimethoxysilane, silane coupling agents which exhibit the same function as a mercapto silane coupling agent by pyrolysis, such as bis(3-triethoxysilylpropyl)tetrasulfide and bis(3-triethoxysilylpropyl)disulfide. Further, this silane coupling agent may be blended after being subjected to a hydrolysis reaction in advance. These silane coupling agents may be used singly or may be used in combination of two or more kinds thereof.

From the viewpoint of continuous moldability, mercaptosilane is preferred; from the viewpoint of flowability, aminosilane is preferred; and from the viewpoint of adhesiveness, epoxysilane is preferred.

The lower limit of the content of the coupling agent (F) which may be used for the fixing resin composition according to the present invention is preferably equal to or more than 0.01% by mass, more preferably equal to or more than 0.05% by mass, and particularly preferably equal to or more than 0.1% by mass, based on 100% by mass of the entire fixing resin composition according to the present invention. If the lower limit of the content of the coupling agent (F) such as a silane coupling agent is within the above range, good vibration resistance is obtained without lowering the interfacial strength between the epoxy resin (A1) and the inorganic filler (C). Further, the upper limit of the content of the coupling agent (F) such as a silane coupling agent is preferably equal to or less than 1% by mass, more preferably equal to or less than 0.8% by mass, and particularly preferably equal to or less than 0.6% by mass, based on 100% by mass of the entire fixing resin composition according to the present invention. If the upper limit of the content of the coupling agent (F) such as a silane coupling agent is within the above range, good vibration resistance is obtained without lowering the interfacial strength between the epoxy resin (A1) and the inorganic filler (C). In addition, if the content of the coupling agent (F) such as a silane coupling agent is within the above range, good rust resistance is obtained without increasing water absorption of the cured product of the fixing resin composition.

An inorganic flame retardant (G) may be added to the fixing resin composition according to the present invention to improve flame retardancy. Among those, a metal hydroxide or a composite metal hydroxide which can inhibit the combustion reaction through dehydration and heat absorption during combustion is preferred in that a combustion time can be shortened. Examples of the metal hydroxide include aluminum hydroxide, magnesium hydroxide, calcium hydroxide, barium hydroxide, and zirconium hydroxide. The composite metal hydroxide may be a hydrotalcite compound containing two or more kinds of metal elements, in which at least one metal element is magnesium, and other elements are elements selected from calcium, aluminum, tin, titanium, iron, cobalt, nickel, copper, and zinc. As such a composite metal hydroxide, a magnesium hydroxide/zinc solid solution is commercially easily available. Among these, aluminum hydroxide, a magnesium hydroxide/zinc solid solution is preferred from the viewpoint of continuous moldability. The inorganic flame retardants (G) may be used singly or in combination of two or more kinds thereof. Further, for the purpose of reducing the effects from continuous moldability, use may be made with a surface treatment using, for example, silicon compounds such as a silane coupling agent or aliphatic compounds such as a wax.

The content of the inorganic flame retardant (G) according to the present invention is preferably equal to or more than 1% by mass and equal to or less than 20% by mass, and more preferably equal to or more than 3% by mass and equal to or less than 10% by mass, based on 100% by mass of the total content of the fixing resin composition according to the present invention.

In the fixing resin composition according to the present invention, the upper limit of the concentration of the ionic impurities is preferably equal to or less than 500 ppm, more preferably equal to or less than 300 ppm, and even more preferably equal to or less than 200 ppm, based on the fixing resin composition. The lower limit of the concentration of the ionic impurities is preferably equal to or more than 0 ppb, more preferably equal to or more than 10 ppb, more preferably equal to or more than 100 ppb, based on the fixing resin composition according to the present invention. Thus, when the cured product of the fixing resin composition according to the present invention is used for the fixing member, high rust resistance can be maintained even with a treatment under a high temperature and a high humidity.

The ionic impurities according to the present invention are not particularly limited, but examples thereof include alkali metal ions, alkaline earth metal ions, and halogen ions, and more specifically sodium ions and chlorine ions. The upper limit of the concentration of the sodium ions is preferably equal to or less than 100 ppm, more preferably equal to or less than 70 ppm, and even more preferably equal to or less than 50 ppm, based on the fixing resin composition according to the present invention. Further, the upper limit of the concentration of the chlorine ions is preferably equal to or less than 100 ppm, more preferably equal to or less than 50 ppm, and even more preferably equal to or less than 30 ppm, based on the fixing resin composition according to the present invention. By setting the above range, the corrosion of the electromagnetic steel plate or the magnet can be inhibited.

In the present embodiment, by using, for example, an epoxy resin having high purity, ionic impurities can be reduced. Thus, a rotor having excellent durability is obtained.

The concentration of the ionic impurities can be determined as follows. First, the fixing resin composition according to the present invention is molded and cured at 175° C. for 180 seconds, and then pulverized by a pulverizing machine to obtain powder of a cured product. The obtained powder of the cured product is treated at 120° C. for 24 hours in pure water and ions are extracted in pure water. Then, the concentration of the ionic impurities is measured by Inductively Coupled Plasma Mass Spectrometry (ICP-MS).

In the fixing resin composition according to the present invention, the upper limit of the content of alumina is preferably equal to or less than 10% by mass, more preferably equal to or less than 7% by mass, and more preferably equal to or less than 5% by mass, based on 100% by mass of the total content of the fixing resin composition. The lower limit of the content of alumina is not particularly limited, but it is preferably, for example, equal to or more than 0% by mass, more preferably equal to or more than 0.01% by mass, and even more preferably equal to or more than 0.1% by mass, based on 100% by mass of the total content of the fixing resin composition according to the present invention. By setting the content of alumina to equal to or less than the upper limit, improvement of flowability and reduction in weight and size of the fixing resin composition according to the present invention can be achieved. In addition, in the present embodiment, 0% by mass permits a value within a detection limit.

In the fixing resin composition according to the present invention, in addition to the components described above, ion scavengers such as hydrotalcites and hydrous oxides of elements selected from the magnesium, aluminum, bismuth, titanium, and zirconium; colorants such as carbon black, red iron oxide, and titanium oxide; natural waxes such as a carnauba wax; synthetic waxes such as a polyethylene wax; releasing agents such as higher fatty acids and metal salts thereof, such as stearic acid and zinc stearate, or paraffin; and low-stress agents such as a polybutadiene compound, an acrylonitrile butadiene copolymerization compound, and silicon compounds such as silicone oil and silicone rubber; or the like may be appropriately incorporated.

The content of the colorant according to the present invention is preferably equal to or more than 0.01% by mass and equal to or less than 1% by mass, and more preferably equal to or more than 0.05% by mass and equal to or less than 0.8% by mass, based on 100% by mass of the total content of the fixing resin composition according to the present invention. By setting the content of the colorant within the above range, a step of removing colored impurities is not required, and thus, the workability is improved. Therefore, a rotor having excellent yield is achieved.

For the content of the releasing agent according to the present invention, based on 100% by mass of the total content of the fixing resin composition according to the present invention, the lower limit is not particularly limited, but it is preferably, for example, equal to or more than 0.01% by mass, and more preferably equal to or more than 0.05% by mass, while the upper limit is, for example preferably equal to or less than 1% by mass, more preferably equal to or less than 0.5% by mass, even more preferably equal to or less than 0.2% by mass, and particularly preferably equal to or less than 0.1% by mass. Generally, if a semiconductor chip is transfer-molded, it is known to add a certain amount of a releasing agent to secure the release of a fixing member from a mold. However, if the addition amount of the releasing agent is too high, the adhesiveness between the fixing member and the electromagnetic steel plate may be reduced. Thus, in the present invention, the content of the releasing agent is preferably low, and particularly preferably equal to or less than 0.2% by mass. From this, the adhesiveness between the fixing member and the electromagnetic steel plate can be enhanced, and thus, a rotor having excellent durability is achieved.

The content of the low-stress agent according to the present invention is preferably equal to or more than 0.01% by mass and equal to or less than 3% by mass, and more preferably equal to or more than 0.05% by mass and equal to or less than 2% by mass, based on 100% by mass of the total content of the fixing resin composition according to the present invention.

Regarding the fixing resin composition of the present invention, when the fixing resin composition is injected into a flow passage having a cross-section with a width of 3 mm and a thickness of 80 μm under the conditions of a mold temperature of 175° C., a molding pressure of 6.9 MPa, an injection time of 20 seconds, and a curing time of 90 seconds, the slit flow length is preferably equal to or more than 30 mm, and more preferably equal to or more than 50 mm. If the slit flow length is equal to or more than the lower limit, good fillability in a separation portion (filling portion) between a hole portion and a magnet of a rotor, in particular, the fillability in the transverse direction can be achieved. The upper limit of the slit flow length is not particularly limited, but is preferably equal to or less than 150 mm, and more preferably equal to or less than 100 mm. Thus, a rotor having excellent preparation stability is achieved.

Furthermore, in the present embodiment, for example, the slit flow length can be increased by, for example, decreasing the particle diameter of the filler, or lowering the softening point of the epoxy resin or the curing agent, or decreasing the amount of a curing accelerator.

The high-formula viscosity of the fixing resin composition according to the present invention, as measured at a measurement temperature of 175° C. and a load of 10 kg, using a high-formula viscosity measurement device, is preferably equal to or more than 6 Pa·s and equal to or less than 50 Pa·s, and more preferably equal to or more than 10 Pa·s and equal to or less than 30 Pa·s. If the high-formula viscosity is equal to or more than the lower limit, generation of voids due to entrainment or the like during molding can be inhibited, whereas if the high-formula viscosity is equal to or less than the upper limit, good fillability is obtained. Thus, a rotor having excellent preparation stability is achieved.

Furthermore, in the present embodiment, the high-formula viscosity can be decreased by, for example, lowering the softening point of the epoxy resin or the curing agent, using a latent curing accelerator, or using fused spherical silica as a filler.

The gel time of the fixing resin composition according to the present invention at 175° C. is preferably equal to or more than 10 seconds and equal to or less than 40 seconds, and more preferably equal to or more than 15 seconds and equal to or less than 30 seconds. If the gel time is equal to or more than the lower limit, the fillability can be improved, whereas if the gel time is equal to or less than the upper limit, the molding cycle can be accelerated.

Furthermore, in the present embodiment, the gel time can be decreased by, for example, increasing the amount of the curing accelerator. Thus, a rotor having excellent preparation stability is achieved.

The spiral flow of the fixing resin composition according to the present invention is preferably equal to or more than 50 cm, and more preferably equal to or more than 60 cm. If the spiral flow is equal to or more than the lower limit, the fillability, in particular the fillability in the vertical direction can be improved. The upper limit of the spiral flow is not particularly limited, but is preferably equal to or less than 200 cm, and more preferably equal to or less than 150 cm. Thus, a rotor having excellent preparation stability is achieved.

Furthermore, in the present embodiment, the spiral flow can be increased by, for example, using fused spherical silica as a filler, lowering the softening point of the epoxy resin or the curing agent, or decreasing the amount of the curing accelerator.

When the cure torque of the fixing resin composition according to the present invention is measured over time at a measurement temperature of 175° C. using a curelastometer, the cure torque value at 60 seconds after measurement initiation is defined as $T_{60}$ and the maximum cure torque value up to 300 seconds after measurement initiation is defined as $T_{max}$, the ratio of the cure torque value at 60 seconds after measurement initiation to the maximum cure torque value up to 300 seconds after measurement initiation, $T_{60}/T_{max}(\%)$, is preferably equal to or more than 40%, and more preferably equal to or more than 50%. The upper limit of the ratio of the cure torque values is not particularly limited, but is preferably equal to or less than 100%, and more preferably equal to or less than 95%. If the ratio of the cure torque values is equal to or more than the lower limit, the improvement of productivity can be expected.

Furthermore, in the present embodiment, the ratio of the cure torque values can be increased by, for example, increasing the amount of the curing accelerator. Thus, a rotor having excellent preparation stability is achieved.

The fixing resin composition according to the present invention may be uniformly mixed at normal temperature using, for example, a mixer, and then, if necessary, melt-kneaded using a kneading machine such as a heating roll, a kneader, and an extruder, and subsequently, if necessary, cooled and pulverized, in order to adjust to a desired degree of dispersion and flowability, or the like.

The preparation method for the fixing resin composition according to the present invention is not particularly limited, but a thermosetting resin (A), a phenolic resin-based curing agent (B), and an inorganic filler (C), and preferably other additives or the like are blended in predetermined amounts. The blend is uniformly mixed at normal temperature using, for example, a mixer, a jet mill, a ball mill, or the like, and then, if necessary, melt-kneaded using a kneading machine such as a heating roll, a kneader, and an extruder while warming the fixing resin composition to approximately 90 to 120° C., and the fixing resin composition after kneading is cooled and pulverized to obtain a solid fixing resin composition in the granule or powder shape. The particle size of the powder or granule of the fixing resin composition according to the present invention is preferably, for example, equal to or less than 5 mm. If the particle size is set to equal to or less than 5 mm, generation of filling failure during tabletting or increased imbalance in the mass of the tablet can be inhibited.

Further, the powder or granule of the obtained fixing resin composition can be tablet-molded to obtain a tablet. As a device used in tablet-molding, a single-shot type or multi-communication rotary tabletting machine can be used. The shape of the tablet is not particularly limited, but is preferably cylindrical. The temperature of the male type, the female type, and the environment of the tabletting machine is not particularly limited, but is preferably equal to or lower than 35° C. If the temperature exceeds 35° C., the viscosity increases by the reaction of the fixing resin composition, and thus, the flowability may be deteriorated. The tabletting pressure is preferably in the range of equal to or more than $400 \times 10^4$ and equal to or less than $3000 \times 10^4$. By setting the tabletting pressure to equal to or less than the upper limit, occurrence of fracture immediately after the tabletting can be inhibited. On the other hand, since a sufficient aggregation force is not obtained by setting the tabletting pressure to equal to or more than the lower limit, occurrence of fracture immediately after the tabletting can be inhibited. The material of the male or female mold of the tabletting machine and the surface treatment are not particularly limited, and known materials can be used. Further, examples of the surface treatment include electrical discharge processing, coating with a releasing agent, plating treatment, and polishing.

Furthermore, the glass transition temperature (Tg) of the fixing member according to the present invention is preferably equal to or higher than 150° C., and more preferably equal to or higher than 155° C. If the glass transition temperature (Tg) is equal to or higher than the lower limit, the improvement of reliability can be expected. The upper limit of the glass transition temperature (Tg) is not particularly limited, but is preferably equal to or lower than 200° C., and more preferably equal to or lower than 190° C. Thus, a rotor having excellent durability is achieved.

Furthermore, in the present embodiment, the glass transition temperature (Tg) can be increased by, for example, raising the softening point of the epoxy resin or the curing agent.

The flexural strength of the fixing member according to the present invention at 150° C. is preferably equal to or more than 70 MPa, and more preferably equal to or more than 100 MPa. If the flexural strength is equal to or more than the lower limit, cracks are not easily generated and the improvement of reliability can be expected. The upper limit of the flexural strength is not particularly limited, but is preferably equal to or less than 300 MPa, and more preferably equal to or less than 250 MPa. Thus, a rotor having excellent durability is achieved.

Furthermore, in the present embodiment, the flexural strength can be increased by, for example, treating the surface of the filler with a coupling agent.

The upper limit of the flexural elastic modulus of the fixing member according to the present invention at 150° C. is preferably equal to or less than $1.6 \times 10^4$ MPa, and more preferably equal to or lower than $1.3 \times 10^4$ MPa. If the flexural elastic modulus is equal to or less than the upper limit, the improvement of reliability due to stress relaxation can be expected. The lower limit of the flexural elastic modulus is not particularly limited, but is preferably equal to or more than 5000 MPa, and more preferably equal to or more than 7000 MPa. Thus, a rotor having excellent durability is achieved.

Furthermore, in the present embodiment, the flexural elastic modulus can be decreased by, for example, increasing the addition amount of a low-stress agent or by decreasing the blending amount of the filler.

In the region which is equal to or higher than 25° C. and equal to lower than the glass transition temperature (Tg) of the fixing member according to the present invention, the linear expansion coefficient ($\alpha 1$) is preferably equal to or more than 10 ppm/° C. and equal to or less than 25 ppm/° C., and more preferably equal to or more than 15 ppm/° C. and equal to or less than 20 ppm/° C. Within the above range, the difference in the thermal expansion from that of an electromagnetic steel plate is small, and the loss of the magnet can be prevented. Thus, a rotor having excellent durability is achieved.

Furthermore, in the present embodiment, the linear expansion coefficient ($\alpha 1$) can be decreased by, for example, increasing the blending amount of the filler.

In the region which is equal to or higher than 25° C. and equal to lower than the glass transition temperature (Tg) of the fixing member according to the present invention, the linear expansion coefficient ($\alpha 2$) is preferably equal to or more than 10 ppm/° C. and equal to or less than 100 ppm/° C., and more preferably equal to or more than 20 ppm/° C. and equal to or less than 80 ppm/° C. Within the above range, the difference in the thermal expansion from that of an electromagnetic steel plate is small, and the loss of the magnet can be prevented. Thus, a rotor having excellent durability is achieved.

Furthermore, in the present embodiment, the linear expansion coefficient ($\alpha 2$) can be decreased by, for example, increasing the blending amount of the filler.

(Method for Preparing Rotor)

The method for preparing the rotor 100 according to the present embodiment includes a step of preparing the rotor core 110, in which a plurality of hole portions 150 arranged along the peripheral portion of a through hole through which a rotating shaft (shaft 170) is penetrated are formed, a step of inserting a magnet 120 into hole portion 150, a step of filling a fixing resin composition in a separation portion between the hole portion 150 and the magnet 120, a step of curing the resin composition to obtain a fixing member 130, and a step of inserting the shaft 170 into the through hole of the rotor core 110 while fixing and installing the shaft 170 in the rotor core.

In the present embodiment, in a technique for filling a fixing resin composition, insert molding is preferably used, which will be described in detail.

First, an insert molding device will be described.

FIG. 2 is a cross-sectional view of an upper mold 200 of an insert molding device used in insert molding.

As one example of a method for forming the fixing member 130, a method involving carrying out insert molding using a fixing resin composition in the tablet shape may be used. For this insert molding, an insert molding device is used. This molding device includes an upper mold 200 having a pot 210 to which a fixing resin composition in the tablet shape is supplied and a flow passage 220 for transferring the fixing resin composition in the molten state, a lower mold, a heating unit for heating the upper mold and the lower mold, and an extrusion unit for extruding the fixing resin composition in the molten state. The insert molding device may be provided with, for example, a transporting function for transporting a rotor core or the like.

In the present embodiment, the upper mold 200 and the lower mold are preferably closed to the upper surface and the lower surface of the rotor core 110 (that is, a surface of the electromagnetic steel plate constituting the rotor core 110), and more preferably it is, for example, in the plate shape. The upper mold 200 and the lower mold are different from molds usually used for a transfer molding which is used in a method for preparing a semiconductor device in that the upper mold 200 and the lower mold do not cover the entire rotor core 110, that is, do not cover, for example, a part on one side. The mold for the transfer molding is configured such that the entire semiconductor chip is arranged in a cavity constituted with an upper mold and a lower mold.

Furthermore, the pot 210 may have two other flow passages 220, and may have flow passages 220 in the Y shape. Thus, the fixing resin composition according to the present invention can be filled in two hole portions from one pot 210. Further, one pot may have one flow passage for filling the fixing resin composition in one hole portion, but may have three flow passages for filling the fixing resin composition in three hole portions. Here, a plurality of flow passages may be independent of one another, but may be continuous.

Subsequently, the insert molding according to the present embodiment will be described.

First, a rotor core is preheated in an oven or a heat plate, and then fixed on a lower mold, not shown in the drawing, of a molding device. Subsequently, a magnet is inserted into the hole portion of the rotor core. Subsequently, the lower mold is raised and the upper mold 200 is pressed onto the upper surface of the rotor core. Thus, the upper surface and the lower surface of the rotor core 110 are inserted into the upper mold 200 and the lower mold. At this time, the distal end portion of the flow passage 220 in the upper mold 200 is arranged on the separation portion between the hole portion and the magnet. Further, the rotor core is heated by heat conduction from the lower mold and the upper mold 200 of the molding device. The temperature of the lower mold and the upper mold 200 of the molding device is controlled to, for example, approximately 150° C. to 200° C., which is suitable for molding and curing the resin composition for fixing the rotor core. In this state, the fixing resin composition in the tablet shape is supplied into the pot 210 of the upper mold 200. The fixing resin composition in the tablet shape, supplied into the pot 210 of the upper mold 200, is in the molten state by heating it in the pot 210.

Subsequently, the fixing resin composition in the molten state is extruded from the pot 210 by a plunger (extrusion mechanism). Further, the fixing resin composition moves through the flow passage 220, and filled in the separation portion between the hole portion and the magnet. In this course, the rotor core is heated by heat conduction from the mold (the lower mold and the upper mold 200), thereby curing the fixing resin composition filled therein, to form a fixing member. At this time, the temperature condition may be set to, for example, 150° C. to 200° C. Further, the curing time may be set to, for example, 30 seconds to 180 seconds. Thus, the magnet 120 inserted in the hole portion 150 is fixed by the fixing member 130. Thereafter, the upper mold 200 is separated from the upper surface of the rotor core. Then, the shaft 170 is inserted into the through hole of the rotor core 110 while the shaft 170 is fixed and installed in the rotor core.

By this process, the rotor of the present embodiment is obtained.

Here, the insert molding method of the present embodiment does not require demolding, which is different from a transfer molding method used in the preparation of a semiconductor device.

In the insert molding method, while making the upper surface of the rotor core 110 closer to the upper mold 200, the resin passes through the flow passage of the upper mold 200 and filled in the hole portion of the rotor core 110. As a result, the resin is not filled between the upper surface of the rotor core 110 and the upper mold 200, attachment and detachment between the upper mold 200 and the upper surface become easier.

On the other hand, in the transfer molding method, a resin is filled in a cavity between a semiconductor chip and a mold, and thus, it is necessary to perform demolding from the molded article well. As a result, releasability between the mold and the molded article are required, particularly for a resin that encapsulates a semiconductor chip.

The rotor 100 of the present embodiment can be mounted on transportation units, for example, motor vehicles such as hybrid cars, fuel cell cars, and electric vehicles, trains, and boats and ships.

Furthermore, the present invention relates to the following.

[1]

A rotor provided with a rotor core fixed and installed on a rotating shaft, in which a plurality of hole portions arranged along the peripheral portion of the rotating shaft are formed, a magnet inserted in the hole portion, and the fixing member formed by curing a fixing resin composition, filled in a separation portion between the hole portion and the magnet, wherein the fixing resin composition includes:

a thermosetting resin (A) containing an epoxy resin, a curing agent (B), and an inorganic filler (C), and the content of the inorganic filler (C) is equal to or more than 50% by mass, based on 100% by mass of the total content of the fixing resin composition.

[2]

The rotor according to [1], wherein the inorganic filler (C) contains silica.

[3]

The rotor according to [2], wherein the content of silica is equal to or more than 40% by mass, based on 100% by mass of the total content of the fixing resin composition.

[4]

The rotor according to any one of [1] to [3], wherein in the fixing resin composition, the content of alumina is equal to or less than 10% by mass, based on 100% by mass of the total content of the fixing resin composition.

[5]
The rotor according to any one of [1] to [4], wherein the inorganic filler (C) contains two or more kinds of spherical silica having different average particle diameters, $D_{50}$.

[6]
The rotor according to [5], wherein the average particle diameter $D_{50}$ is equal to or less than 75 μm.

[7]
The rotor according to any one of [1] to [6], wherein the curing agent (B) contains a phenolic resin.

[8]
The rotor according to anyone of [1] to [7], wherein the fixing resin composition further includes a curing accelerator (D).

[9]
The rotor according to [8], wherein the curing accelerator (D) contains at least one selected from a tetra-substituted phosphonium compound, a phosphobetaine compound, an adduct of a phosphine compound and a quinone compound, and an adduct of a phosphonium compound and a silane compound.

[10]
The rotor according to anyone of [1] to [9], wherein the fixing resin composition further includes an inorganic flame retardant (G).

[11]
The rotor according to [10], wherein the inorganic flame retardant (G) contains a metal hydroxide or a composite metal hydroxide.

[12]
The rotor according to any one of [1] to [11], wherein
the concentration of the ionic impurities in the fixing resin composition is equal to or less than 500 ppm, and
the ionic impurities are at least one selected from alkali metal ions, alkaline earth metal ions, and halogen ions.

[13]
The rotor according to any one of [1] to [12], wherein the concentration of the sodium ions in the fixing resin composition is equal to or less than 100 ppm.

[14]
The rotor according to any one of [1] to [13], wherein the concentration of the chlorine ions in the fixing resin composition is equal to or less than 100 ppm.

[15]
The rotor according to any one of [1] to [14], wherein
the fixing resin composition further includes an ion scavenger, and
the ion scavenger includes hydrotalcites, or hydrous oxides of elements selected from magnesium, aluminum, bismuth, titanium, and zirconium.

[16]
The rotor according to any one of [1] to [15], wherein
the fixing resin composition further includes a low-stress agent, and
the low-stress agent contains a polybutadiene compound, an acrylonitrile-butadiene copolymerization compound, or a silicone compound.

[17]
The rotor according to any one of [1] to [16], wherein the magnet is constituted with a neodymium magnet.

[18]
The rotor according to any one of [1] to [17], wherein the fixing member is formed by insert molding using the fixing resin composition in the tablet shape.

[19]
The rotor according to any one of [1] to [18], wherein when the fixing resin composition is injected into a flow passage having a cross-section with a width of 3 mm and a thickness of 80 μm under the conditions of a mold temperature of 175° C. and a molding pressure of 6.9 MPa, the slit flow length is equal to or more than 30 mm.

[20]
The rotor according to any one of [1] to [19], wherein the glass transition temperature (Tg) of the fixing member is equal to or higher than 150° C.

[21]
The rotor according to any one of [1] to [20], wherein the flexural strength of the fixing member at 150° C. is equal to or more than 70 MPa.

[22]
The rotor according to any one of [1] to [21], wherein the flexural elastic modulus of the fixing member at 150° C. is equal to or less than $1.6 \times 10^4$ MPa.

[23]
The rotor according to any one of [1] to [22], wherein in the region which is equal to or higher than 25° C. and equal to lower than the glass transition temperature (Tg), the linear expansion coefficient ($\alpha 1$) is equal to or more than 10 ppm/° C. and equal to or less than 25 ppm/° C.

[24]
The rotor according to any one of [1] to [23], wherein the high-formula viscosity of the fixing resin composition, as measured at a measurement temperature of 175° C. and a load of 10 kg, using a high-formula viscosity measurement device, is equal to or more than 6 Pa·s and equal to or less than 50 Pa·s.

[25]
The rotor according to any one of [1] to [24], wherein the gel time of the fixing resin composition at 175° C. is preferably equal to or more than 10 seconds and equal to or less than 40 seconds.

[26]
The rotor according to any one of [1] to [25], wherein the spiral flow of the fixing resin composition is equal to or more than 50 cm.

[27]
The rotor according to any one of [1] to [26], wherein when the cure torque of the fixing resin composition is measured over time at a measurement temperature of 175° C. using a curelastometer, the cure torque value at 60 seconds after measurement initiation is defined as $T_{60}$ and the maximum cure torque value up to 300 seconds after measurement initiation is defined as $T_{max}$, the ratio of the cure torque value at 60 seconds after measurement initiation to the maximum cure torque value up to 300 seconds after measurement initiation, $T_{60}/T_{max}$(%) is equal to or more than 40%.

[28]
An automobile provided with the rotor according to any one of [1] to [27].

[29]
A method for preparing a rotor, including:
a step of preparing the rotor core, in which a plurality of hole portions arranged along the peripheral portion of a through hole through which a rotating shaft is penetrated are formed,
a step of inserting a magnet into the hole portion,
a step of filling a fixing resin composition in a separation portion between the hole portion and the magnet,
a step of curing the resin composition to obtain a fixing member, and a step of inserting the rotating shaft into the through hole of the rotor core while fixing and installing the rotating shaft in the rotor core, wherein the fixing resin composition includes a thermosetting resin (A) containing an epoxy resin, a curing agent (B), and an inorganic filler (C), and the content of the inorganic filler (C) is equal to or more than 50% by mass, based on 100% by mass of the total content of the fixing resin composition.

Examples

Hereinbelow, the present invention will be described with reference to Examples, but the present invention is not limited to the description in Examples in any way. Unless specified otherwise, the "part(s)" and "%" as described below denote "part(s) by mass" and "% by mass", respectively.

The starting materials used in the respective Examples and Comparative Examples are shown below.

(Thermosetting Resin (A))

Epoxy resin 1: Orthocresol novolac type epoxy resin (manufactured by DIC Corporation, EPICLON N-665, epoxy equivalents 198 g/eq, softening point 62° C.)

Epoxy resin 2: Orthocresol novolac type epoxy resin (manufactured by DIC Corporation, EPICLON N-670, epoxy equivalents 199 g/eq, softening point 65° C.)

Epoxy resin 3: Orthocresol novolac type epoxy resin (manufactured by DIC Corporation, EPICLON N-690, epoxy equivalents 200 g/eq, softening point 92° C.)

Epoxy resin 4: Bisphenol A type epoxy resin (manufactured by Mitsubishi Chemical Corporation, jER1001, epoxy equivalents 475 g/eq, softening point 64° C.)

(Curing Agent (B))

Phenolic resin-based curing agent 1: Novolac type phenolic resin (manufactured by Sumitomo Bakelite Co., Ltd., PR-51714, hydroxyl group equivalents 104 g/eq, softening point 92° C.)

Phenolic resin-based curing agent 2: Novolac type phenolic resin (manufactured by Sumitomo Bakelite Co., Ltd., PR-51470, hydroxyl group equivalents 104 g/eq, softening point 110° C.)

(Inorganic Filler (C))

Fused spherical silica 1 (manufactured by Denki Kagaku Kogyo Kabushiki Kaisha, FB-950, average particle diameter $D_{50}$ 38 μm)

Fused spherical silica 2 (manufactured by Denki Kagaku Kogyo Kabushiki Kaisha, FB-35, average particle diameter $D_{50}$ 15 μm)

Alumina (manufactured by Nippon Light Metal Company, Ltd., A13, average particle diameter $D_{50}$ 50 μm)

(Curing Accelerator (D))

Curing accelerator 1: Triphenylphosphine

Curing accelerator 2: Curing accelerator represented by the following formula (7)

[Chemical formula 7]

$$Ph_4P^{\oplus} - {}^{\ominus}BPh_4 \quad (7)$$

Curing accelerator 3: Curing accelerator represented by the following formula (8)

[Chemical formula 8]

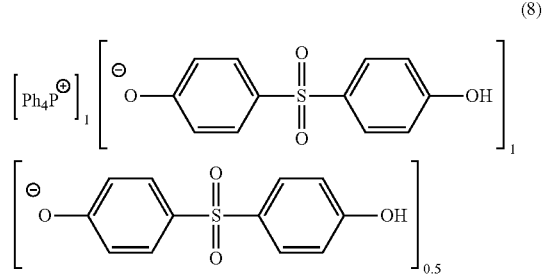

(8)

Curing accelerator 4: Curing accelerator represented by the following formula (9)

[Chemical formula 9]

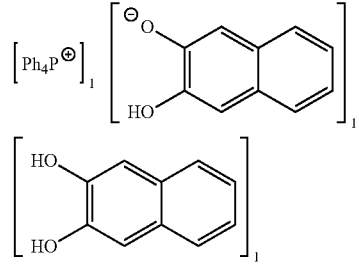

(9)

Curing accelerator 5: Curing accelerator represented by the following formula (10)

[Chemical formula 10]

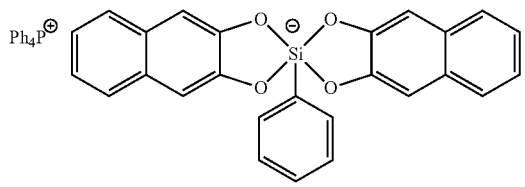

(10)

Curing accelerator 6: Curing accelerator represented by the following formula (11)

[Chemical formula 11]

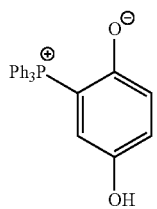

(11)

(Coupling Agent (F))

Silane coupling agent 1: Phenylaminopropyltrimethoxysilane (manufactured by Dow Corning Toray Co., Ltd., CF4083)

Silane coupling agent 2: γ-Glicydoxypropyltrimethoxysilane (manufactured by Shin-Etsu Chemical Co. Ltd., KBM-403)

(Inorganic Flame Retardant (G))

Aluminum hydroxide (manufactured by Sumitomo Chemical Co., Ltd., CL-303)

(Other Additives)

Ion Scavenger Hydrotalcite (manufactured by Kyowa Chemical Industry Co., Ltd., trade name DHT-4H)

Colorant: Carbon black (manufactured by Mitsubishi Chemical Corporation, MA600)

Releasing agent: Montanic ester wax (manufactured by Hoechst, Hoechst Wax E)

Low-stress agent 1: Silicone resin (manufactured by Nikko Fine Product Co., Ltd., MSP-150)

Low-stress agent 2: Silicone oil (manufactured by Nippon Unicar Co., Ltd., FZ-3730)

Examples

With respect to Examples, the respective components according to the blending amounts shown in Tables 1 to 3 were mixed at a normal temperature using a mixer to obtain an intermediate in the powder shape. The obtained intermediate in the powder shape was loaded in an automatic feeder (hopper), supplied quantitatively to a heating roll at 80° C. to 100° C., and melt-kneaded. Thereafter, the intermediate was cooled and then pulverized to obtain a fixing resin composition. The obtained fixing resin composition was tablet-molded using a molding device to obtain a tablet.

On the other hand, a rotor was prepared in the following manner, using an insert molding device provided with an upper mold 200 shown in FIG. 2. First, the rotor core was fixed in the lower mold of a molding device, and subsequently, a neodymium magnet was inserted into the hole portion of a rotor core. Then, the lower mold was raised and the upper mold 200 was pressed onto the upper surface of the rotor core. Subsequently, the fixing resin composition in the tablet shape was supplied to the pot 210 of the upper mold 200, and then the fixing resin composition in the molten state was extruded from the pot 210 by a plunger. The fixing resin composition was filled in a separation portion between the hole portion and a neodymium magnet, and heated and cured to form a fixing member, thereby obtaining a rotor. Here, the molding conditions were as follows: a rotor core temperature: 160° C. and a curing time: 120 seconds.

For the obtained fixing resin composition and rotor, the measurements and evaluations as shown below were carried out. The results are shown in Tables 1 to 3. The rotors in Examples were excellent in strength.

(Evaluation Items)

Concentration of Ionic Impurities: The fixing resin composition was molded and cured under the conditions of 175° C. and 180 seconds, and then pulverized with a pulverizer to obtain powder of a cured product. The cured product was treated in pure water at 120° C. for 24 hours to extract metal ions in pure water. Thereafter, the concentration was measured using Inductively Coupled Plasma Mass Spectrometry (ICP-MS). The unit is ppm. The total ionic impurities concentrations, the sodium ion concentrations, and the chlorine ion concentrations are shown in the Tables.

Spiral Flow: The fixing resin composition was injected into a mold for spiral flow measurement in accordance to ANSI/ASTM D 3123-72, using a molding machine (KTS-15, manufactured by Kohtaki Precision Machine Co., Ltd.) under the conditions of 175° C., an injection pressure of 6.9 MPa, and a holding time of 120 seconds, and the flow length was measured. The flow length is a parameter of flowability, and a larger value thereof indicates better flowability. The unit is cm.

Gel Time: The fixing resin composition was loaded on a heat plate controlled to 175° C., and then kneaded with a spatula at a stroke of about once/sec. After the fixing resin composition was molten by heat, the time taken for curing is measured and defined as a gel time. The unit is sec.

High-Formula Viscosity: About 2.5 g of the fixing resin composition was shaped into a tablet (diameter of 11 mm, height of about 15 mm), and then the high-formula viscosity was measured using a high-formula viscosity measurement device (CFT-500D manufactured by Shimadzu Corporation), with nozzles (dice) at a diameter of 0.5 mm and a length of 1.0 mm, under the conditions of a measurement temperature of 175° C. and a load of 10 kg. The unit was Pa·s.

Curelast Torque Ratio: When the cure torque of the fixing resin composition was measured over time at a measurement temperature of 175° C. using a curelastometer (JSR curelastometer IVPS type, manufactured by Orientec Co., Ltd.), the cure torque value at 60 seconds after measurement initiation was defined as $T_{60}$ and the maximum cure torque value up to 300 seconds after measurement initiation was defined as $T_{max}$, the ratio of the cure torque value at 60 seconds after measurement initiation to the maximum cure torque value up to 300 seconds after measurement initiation, $T_{60}/T_{max}$ (%), was determined as a curelast torque ratio. The torque in the curelastometer is a parameter for thermal rigidity, and a larger curelast torque ratio indicates better curability.

Slit Flow Length: The fixing resin composition was injection-molded in a mold radially provided with grooves (slits) each having a specific thickness with open tips under the conditions of a mold temperature of 175° C., a molding pressure of 6.9 MPa, an injection time of 20 seconds, and a curing time of 90 seconds, and the slit flow length was measured with a vernier caliper the length of the resin flowing out to the slit with a width of 3 mm and a thickness of 80 μm. The unit is mm.

Rotor Moldability: A mold (a width of 30 mm, a thickness of 4 mm, and a depth of 75 mm of the hole portions) as an electromagnetic steel plate with a metal piece (a width of 28 mm, a thickness of 3.5 mm, and a length of 74 mm) as a magnet inserted in the mold was set in a molding machine, and an upper mold was pressed on the upper surface of the mold. When the mold reached 170° C., the fixing resin composition was injection-molded, and the mold was taken out of the molding machine after a curing time of 120 seconds. The appearance of the molded article was visually observed to check if there were any abnormalities such as a void. The state where there was no abnormality such as a void is denoted as ○ and the state where there was abnormality such as a void is denoted as x.

Glass Transition Temperature and Linear Expansion Coefficient (α1, α2): The fixing resin composition was injection-molded using a molding machine (KTS-30, manufactured by Kohtaki Precision Machine Co., Ltd.) under the conditions of a mold temperature of 175° C., an injection pressure of 9.8 MPa, and a curing time of 2 minutes to obtain a test piece at 4 mm×4 mm×15 mm. After post-curing the obtained test piece at 175° C. for 4 hours, the linear expansion coefficient (α1) in the region at equal to or lower than the glass transition temperature and the linear expansion coefficient (α2) in the region corresponding to the rubber state were determined, from the chart, as measured at a temperature rising rate of 5° C./rain in the temperature region in a measurement temperature range from 0° C. to 320° C., using thermal machine analysis device (TMA100, manufactured by Seiko Instruments Inc.). Further, the intersection of the extended lines of the determined α1 and α2 was defined as a glass transition temperature. The unit of the glass transition temperature was ° C. and the unit of the linear expansion coefficients (α1, α2) was ppm/° C.

Flexural Strength and Flexural Elastic Modulus (150° C.): The fixing resin composition was injection-molded using a molding machine (KTS-30, manufactured by Kohtaki Precision Machine Co., Ltd.) under the conditions of a mold temperature of 175° C., an injection pressure of 9.8 MPa, and a curing time of 120 seconds to obtain a molded article with a length of 80 mm, a width of 10 mm, and a thickness of 4 mm. The obtained molded article was heat-treated at 175° C. for 8 hours in a post-treatment to give a test piece. The flexural strength and the flexural elastic modulus of the test piece were measured under the atmosphere of 150° C. in accordance with JIS K 6911. The unit was MPa.

Oil Resistance: The test pieces (molded articles) obtained for the measurement of the flexural strength and the flexural elastic modulus were placed in a pressure resistant container and immersed at a temperature of 150° C. for 1000 hours in the state where ATF oil (Nissan Matic Fluid D) was filled in the pressure-resistant vessel. Then, by the above-described method, the flexural strength and the elastic modulus were measured. For the initial values before immersion in ATF oil, a variation within 10% was denoted as ○ and a variation over 10% was denoted as x.

TABLE 1

| | | Example | | | | | | | |
|---|---|---|---|---|---|---|---|---|---|
| | | 1 | 2 | 3 | 4 | 5 | 6 | 7 | 8 |
| Thermosetting resin (A) | Epoxy resin 1 | | | | | | | | |
| | Epoxy resin 2 | | | | | | | | |
| | Epoxy resin 3 | | | | | | | | |
| | Epoxy resin 4 | 36.50 | 20.00 | 20.00 | 20.00 | 20.00 | 20.00 | 20.00 | 20.00 |
| Curing agent (B) | Phenolic resin-based curing agent 1 | 7.60 | 4.25 | 4.25 | 4.25 | 4.20 | 4.20 | 4.20 | 4.20 |
| | Phenolic resin-based curing agent 2 | | | | | | | | |
| Inorganic filler (C) | Fused spherical silica 1 | 55.0 | 75.0 | 70.0 | 37.5 | 75.0 | 75.0 | 75.0 | 75.0 |
| | Fused spherical silica 2 | | | | 37.5 | | | | |
| | Alumina | | | 5.0 | | | | | |
| Curing accelerator (D) | Curing accelerator 1 | 0.50 | 0.35 | 0.35 | 0.35 | | | | |
| | Curing accelerator 2 | | | | | 0.40 | | | |
| | Curing accelerator 3 | | | | | | 0.40 | | |
| | Curing accelerator 4 | | | | | | | 0.40 | |
| | Curing accelerator 5 | | | | | | | | 0.40 |
| | Curing accelerator 6 | | | | | | | | |
| Coupling agent (F) | Silane coupling agent 1 | | | | | | | | |
| | Silane coupling agent 2 | 0.20 | 0.20 | 0.20 | 0.20 | 0.20 | 0.20 | 0.20 | 0.20 |
| Inorganic flame retardant (G) | Aluminum hydroxide | | | | | | | | |
| Other additives | Hydrotalcite | | | | | | | | |
| | Carbon black | | | | | | | | |
| | Montanic ester wax | 0.20 | 0.20 | 0.20 | 0.20 | 0.20 | 0.20 | 0.20 | 0.20 |
| | Low-stress agent 1 | | | | | | | | |
| | Low-stress agent 2 | | | | | | | | |
| Ionic impurities concentration | Total [ppm] | 80 | 70 | 80 | 70 | 70 | 70 | 70 | 70 |
| | Sodium ion [ppm] | 10 | 9 | 9 | 9 | 9 | 9 | 9 | 9 |
| | Chlorine ion [ppm] | 20 | 18 | 18 | 18 | 18 | 18 | 18 | 18 |
| Flow curing properties | Spiral flow [cm] | 100 | 60 | 55 | 70 | 80 | 85 | 90 | 100 |
| | Gel time [sec] | 25 | 27 | 28 | 26 | 30 | 32 | 35 | 55 |
| | High-formula viscosity [Pa · s] | 12 | 15 | 29 | 14 | 14 | 14 | 14 | 14 |
| | Curelast torque ratio [%] | 50 | 60 | 55 | 60 | 60 | 60 | 60 | 60 |
| Moldability | Slit flow length [mm] | 70 | 50 | 40 | 55 | 60 | 70 | 70 | 70 |
| | Rotor moldability | ○ | ○ | ○ | ○ | ○ | ○ | ○ | ○ |
| Properties of cured product | Glass transition temperature [° C.] | 155 | 155 | 160 | 155 | 155 | 155 | 155 | 155 |
| | Linear expansion coefficient (α1) [ppm/° C.] | 20 | 17 | 18 | 17 | 17 | 17 | 17 | 17 |
| | Linear expansion coefficient (α2) [ppm/° C.] | 80 | 70 | 73 | 70 | 70 | 70 | 70 | 70 |
| | Flexural strength (150° C.) [Mpa] | 100 | 110 | 110 | 115 | 115 | 115 | 115 | 115 |
| | Flexural elastic modulus (150° C.) [Mpa] | 8000 | 12000 | 13000 | 12000 | 12000 | 12000 | 12000 | 12000 |
| | Oil resistance | ○ | ○ | ○ | ○ | ○ | ○ | ○ | ○ |

TABLE 2

|  |  | Example | | | | | | | |
|---|---|---|---|---|---|---|---|---|---|
|  |  | 9 | 10 | 11 | 12 | 13 | 14 | 15 | 16 |
| Thermosetting resin (A) | Epoxy resin 1 |  |  |  |  |  | 16.25 | 16.25 | 16.25 |
|  | Epoxy resin 2 |  |  |  |  |  |  |  |  |
|  | Epoxy resin 3 |  |  |  |  |  |  |  |  |
|  | Epoxy resin 4 | 20.00 | 20.00 | 19.10 | 19.10 | 19.10 |  |  |  |
| Curing agent (B) | Phenolic resin-based curing agent 1 | 4.20 | 4.25 | 4.15 | 4.15 | 4.15 | 8.00 | 8.00 | 8.00 |
|  | Phenolic resin-based curing agent 2 |  |  |  |  |  |  |  |  |
| Inorganic filler (C) | Fused spherical silica 1 | 75.0 | 60.0 | 75.0 | 75.0 | 75.0 | 75.0 | 37.5 | 30.0 |
|  | Fused spherical silica 2 |  |  |  |  |  |  | 37.5 | 30.0 |
|  | Alumina |  |  |  |  |  |  |  |  |
| Curing accelerator (D) | Curing accelerator 1 |  | 0.35 | 0.35 | 0.35 | 0.35 | 0.35 | 0.35 | 0.35 |
|  | Curing accelerator 2 |  |  |  |  |  |  |  |  |
|  | Curing accelerator 3 |  |  |  |  |  |  |  |  |
|  | Curing accelerator 4 |  |  |  |  |  |  |  |  |
|  | Curing accelerator 5 |  |  |  |  |  |  |  |  |
|  | Curing accelerator 6 | 0.40 |  |  |  |  |  |  |  |
| Coupling agent (F) | Silane coupling agent 1 |  |  |  |  |  |  |  |  |
|  | Silane coupling agent 2 | 0.20 | 0.20 | 0.20 | 0.20 | 0.20 | 0.20 | 0.20 | 0.20 |
| Inorganic flame retardant (G) | Aluminum hydroxide |  | 15.0 |  |  |  |  |  | 15.0 |
| Other additives | Hydrotalcite |  |  |  |  |  |  |  |  |
|  | Carbon black |  |  |  |  |  |  |  |  |
|  | Montanic ester wax | 0.20 | 0.20 | 0.20 | 0.20 | 0.20 | 0.20 | 0.20 | 0.20 |
|  | Low-stress agent 1 |  |  | 1.00 |  | 1.00 |  |  |  |
|  | Low-stress agent 2 |  |  |  | 1.00 | 1.00 |  |  |  |
| Ionic impurities concentration | Total [ppm] | 70 | 80 | 75 | 75 | 80 | 50 | 50 | 60 |
|  | Sodium ion [ppm] | 9 | 16 | 9 | 9 | 9 | 5 | 5 | 10 |
|  | Chlorine ion [ppm] | 18 | 18 | 18 | 18 | 18 | 10 | 10 | 10 |
| Flow curing properties | Spiral flow [cm] | 75 | 60 | 60 | 60 | 60 | 70 | 80 | 70 |
|  | Gel time [sec] | 28 | 27 | 27 | 27 | 27 | 25 | 23 | 25 |
|  | High-formula viscosity [Pa·s] | 14 | 15 | 15 | 15 | 15 | 14 | 14 | 14 |
|  | Curelast torque ratio [%] | 60 | 60 | 60 | 60 | 60 | 70 | 70 | 70 |
| Moldability | Slit flow length [mm] | 60 | 50 | 45 | 50 | 40 | 50 | 60 | 55 |
|  | Rotor moldability | ○ | ○ | ○ | ○ | ○ | ○ | ○ | ○ |
| Properties of cured product | Glass transition temperature [° C.] | 155 | 160 | 160 | 160 | 160 | 165 | 165 | 165 |
|  | Linear expansion coefficient (α1) [ppm/° C.] | 17 | 17 | 17 | 17 | 17 | 17 | 17 | 17 |
|  | Linear expansion coefficient (α2) [ppm/° C.] | 70 | 72 | 72 | 72 | 72 | 70 | 70 | 70 |
|  | Flexural strength (150° C.) [Mpa] | 115 | 110 | 110 | 110 | 110 | 110 | 110 | 110 |
|  | Flexural elastic modulus (150° C.) [Mpa] | 13000 | 12000 | 11500 | 11500 | 11000 | 12000 | 12000 | 12000 |
|  | Oil resistance | ○ | ○ | ○ | ○ | ○ | ○ | ○ | ○ |

TABLE 3

|  |  | Example | | | | |
|---|---|---|---|---|---|---|
|  |  | 17 | 18 | 19 | 20 | 21 |
| Thermosetting resin (A) | Epoxy resin 1 | 15.50 | 15.50 | 15.00 | 14.50 | 7.35 |
|  | Epoxy resin 2 |  |  |  |  | 7.35 |
|  | Epoxy resin 3 |  |  |  |  |  |
|  | Epoxy resin 4 |  |  |  |  |  |
| Curing agent (B) | Phenolic resin-based curing agent 1 | 7.75 | 7.75 | 7.25 | 7.50 | 3.50 |
|  | Phenolic resin-based curing agent 2 |  |  |  |  | 3.50 |
| Inorganic filler (C) | Fused spherical silica 1 | 30.0 | 30.0 | 30.0 | 30.0 | 30.0 |
|  | Fused spherical silica 2 | 30.0 | 30.0 | 30.0 | 30.0 | 30.0 |
|  | Alumina |  |  |  |  |  |

TABLE 3-continued

| | | Example | | | | |
|---|---|---|---|---|---|---|
| | | 17 | 18 | 19 | 20 | 21 |
| Curing accelerator (D) | Curing accelerator 1 | 0.35 | 0.35 | 0.35 | 0.35 | 0.35 |
| | Curing accelerator 2 | | | | | |
| | Curing accelerator 3 | | | | | |
| | Curing accelerator 4 | | | | | |
| | Curing accelerator 5 | | | | | |
| | Curing accelerator 6 | | | | | |
| Coupling agent (F) | Silane coupling agent 1 | | | | | 0.40 |
| | Silane coupling agent 2 | 0.20 | 0.20 | 0.20 | 0.20 | |
| Inorganic flame retardant (G) | Aluminum hydroxide | 15.0 | 15.0 | 15.0 | 15.0 | 15.0 |
| Other additives | Hydrotalcite | | | | | 0.10 |
| | Carbon black | | | | 0.25 | 0.25 |
| | Montanic ester wax | 0.20 | 0.20 | 0.20 | 0.20 | 0.20 |
| | Low-stress agent 1 | 1.00 | | 1.00 | 1.00 | 1.00 |
| | Low-stress agent 2 | | 1.00 | 1.00 | 1.00 | 1.00 |
| Ionic impurities concentration | Total [ppm] | 65 | 65 | 70 | 70 | 60 |
| | Sodium ion [ppm] | 10 | 10 | 10 | 10 | 10 |
| | Chlorine ion [ppm] | 10 | 10 | 10 | 10 | 10 |
| Flow curing properties | Spiral flow [cm] | 70 | 70 | 70 | 70 | 70 |
| | Gel time [sec] | 25 | 25 | 25 | 25 | 20 |
| | High-formula viscosity [Pa · s] | 14 | 14 | 14 | 14 | 17 |
| | Curelast torque ratio [%] | 70 | 70 | 70 | 70 | 80 |
| Moldability | Slit flow length [mm] | 50 | 45 | 40 | 40 | 40 |
| | Rotor moldability | ○ | ○ | ○ | ○ | ○ |
| Properties of cured product | Glass transition temperature [° C.] | 165 | 165 | 165 | 165 | 165 |
| | Linear expansion coefficient ($\alpha 1$) [ppm/° C.] | 17 | 17 | 17 | 17 | 18 |
| | Linear expansion coefficient ($\alpha 2$) [ppm/° C.] | 70 | 70 | 70 | 70 | 65 |
| | Flexural strength (150° C.) [Mpa] | 110 | 110 | 110 | 110 | 110 |
| | Flexural elastic modulus (150° C.) [Mpa] | 11500 | 11500 | 11000 | 11000 | 11000 |
| | Oil resistance | ○ | ○ | ○ | ○ | ○ |

From Examples 1 to 21, it can be seen that a rotor having excellent mechanical strength such as rotor moldability is obtained. Further, as compared with the present Examples, the epoxy resin molding materials of Examples 1 and 3 described in Patent Document 2 are deteriorated in rotor moldability and flow curing properties.

Further, it is clear that the embodiments and a plurality of modifications thereof as described above may be combined within a range the contents not conflicting with each other. Further, the structures of the respective portions in the embodiments and a plurality of modifications thereof as described above are specifically described above, but various modifications may be added within a range satisfying the present invention.

The present application claims the priority based on International Patent Application JP2010/005406 filed on Sep. 2, 2010, the entire disclosure of which is hereby incorporated by reference in its entirety.

The invention claimed is:

1. A rotor provided with
a rotor core fixed and installed on a rotating shaft, in which a plurality of hole portions arranged along the peripheral portion of the rotating shaft are formed,
a magnet inserted in the hole portion, and
a fixing member, composed of a cured product of a fixing thermosetting resin composition, that fixes the magnet, the fixing member filled in a separation portion between the hole portion and the magnet and on at least a side wall on an inner peripheral side of the rotor core out of side walls of the magnet,
wherein the fixing thermosetting resin composition includes:
a thermosetting resin (A) containing an epoxy resin;
a curing agent (B); and
an inorganic filler (C),
wherein a total concentration of sodium ions and chlorine ions in the fixing thermosetting resin composition is equal to or less than 500 ppm, and
wherein the fixing thermosetting resin composition further includes a low-stress agent, and
the low-stress agent contains a polybutadiene compound, an acrylonitrile-butadiene copolymerization compound, or a silicone compound, and
wherein, when a cure torque of the fixing thermosetting resin composition is measured over time at a measurement temperature of 175° C. using a curelastometer, the cure torque value at 60 seconds after measurement initiation is defined as $T_{60}$ and the maximum cure torque value up to 300 seconds after measurement initiation is defined as $T_{max}$, the ratio of the cure torque value at 60 seconds after measurement initiation to the maximum cure torque value up to 300 seconds after measurement initiation, $T_{60}/T_{max}(\%)$, is equal to or more than 50%.

2. The rotor according to claim 1, wherein the inorganic filler (C) contains silica.

3. The rotor according to claim 2, wherein the content of silica is equal to or more than 40% by mass, based on 100% by mass of the total content of the fixing resin composition.

4. The rotor according to claim 1, wherein the fixing resin composition contains alumina and silica, as said inorganic filler (C), and a content of the alumina is equal to or less than 10% by mass, based on 100% by mass of the total content of the fixing resin composition.

5. The rotor according to claim 1, wherein the inorganic filler (C) contains two or more kinds of spherical silica having different average particle diameters, $D_{50}$.

6. The rotor according to claim 5, wherein the average particle diameter $D_{50}$ is equal to or less than 75 μm.

7. The rotor according to claim 1, wherein the curing agent (B) contains a phenolic resin.

8. The rotor according to claim 1, wherein the fixing resin composition further includes a curing accelerator (D).

9. The rotor according to claim 8, wherein the curing accelerator (D) contains at least one selected from the group consisting of a tetra-substituted phosphonium compound, a phosphobetaine compound, an adduct of a phosphine compound and a quinone compound, and an adduct of a phosphonium compound and a silane compound.

10. The rotor according to claim 1, wherein the fixing resin composition further includes an inorganic flame retardant (G).

11. The rotor according to claim 10, wherein the inorganic flame retardant (G) contains a metal hydroxide or a composite metal hydroxide.

12. The rotor according to claim 1, wherein a concentration of sodium ions in the fixing resin composition is equal to or less than 100 ppm.

13. The rotor according to claim 1, wherein a concentration of chlorine ions in the fixing resin composition is equal to or less than 100 ppm.

14. The rotor according to claim 1, wherein
the fixing resin composition further includes an ion scavenger, and
the ion scavenger includes hydrotalcites, or hydrous oxides of elements selected from the group consisting of magnesium, aluminum, bismuth, titanium, and zirconium.

15. The rotor according to claim 1, wherein the magnet is constituted with a neodymium magnet.

16. The rotor according to claim 1, wherein the fixing member is formed by insert molding using the fixing resin composition in a tablet shape.

17. The rotor according to claim 1, wherein when the fixing member is filled in the separation portion between the hole portion and the magnet by injecting the fixing resin composition into the separation portion, a slit flow length of the fixing resin composition is equal to or more than 30 mm, the slit flow length obtained by injection-molding the fixing resin composition in a mold radially provided with slits each having a width of 3 mm, a thickness of 80 and an open tip, under the conditions of a mold temperature of 175° C., a molding pressure of 6.9 MPa, an injection time of 20 seconds, and a curing time of 90 seconds, and measuring the length of the resin composition flowing out to the slit.

18. The rotor according to claim 1, wherein a glass transition temperature (Tg) of the fixing member is equal to or higher than 150° C.

19. The rotor according to claim 1, wherein a flexural strength of the fixing member at 150° C. is equal to or more than 70 MPa.

20. The rotor according to claim 1, wherein a flexural elastic modulus of the fixing member at 150° C. is equal to or less than $1.6 \times 10^4$ MPa.

21. The rotor according to claim 1, wherein in the region which is equal to or higher than 25° C. and equal to lower than the glass transition temperature (Tg), the linear expansion coefficient ($\alpha 1$) is equal to or more than 10 ppm/° C. and equal to or less than 25 ppm/° C.

22. The rotor according to claim 1, wherein a high-formula viscosity of the fixing resin composition, as measured at a measurement temperature of 175° C. and a load of 10 kg, using a high-formula viscosity measurement device, is equal to or more than 6 Pa·s and equal to or less than 50 Pa·s.

23. The rotor according to claim 1, wherein a gel time of the fixing resin composition at 175° C. is equal to or more than 10 seconds and equal to or less than 40 seconds.

24. The rotor according to claim 1, wherein a spiral flow of the fixing resin composition is equal to or more than 50 cm.

25. An automobile provided with the rotor according to claim 1.

26. The rotor according to claim 1, wherein the total concentration of sodium ions and chlorine ions in the fixing resin composition is equal to or less than 500 ppm and more than 10 ppb.

27. The rotor according to claim 1, wherein the thermosetting resin (A) is selected from the group consisting of an epoxy resin, a phenolic resin, an oxetane resin, a (meth) acrylate resin, an unsaturated polyester resin, a diallyl phthalate resin, a maleimide resin.

28. The rotor according to claim 1, wherein a content of the thermosetting resin (A) is equal to or more than 5% by mass and equal to or less than 40% by mass based on 100% by mass of the total content of the fixing thermosetting resin composition.

29. The rotor according to claim 1, wherein a content of the epoxy resin is equal to or more than 70% by mass and equal to or less than 100% by mass based on 100% by mass of the thermosetting resin (A).

30. A fixing thermosetting resin composition used for forming a fixing member in a rotor provided with
a rotor core fixed and installed over a rotating shaft, in which a plurality of hole portions arranged along the peripheral portion of the rotating shaft are formed,
a magnet inserted in the hole portion, and
the fixing member, composed of a cured product of a fixing thermosetting resin composition, that fixes the magnet, the fixing member provided in a separation portion between the hole portion and the magnet and on at least a side wall on an inner peripheral side of the rotor core out of side walls of the magnet,
wherein the fixing thermosetting resin composition comprises:
a thermosetting resin (A) containing an epoxy resin,
a curing agent (B), and
an inorganic filler (C),
wherein a content of the inorganic filler (C) is equal to or more than 50% by mass, based on 100% by mass of a total content of the fixing thermosetting resin composition,
the fixing thermosetting resin composition further includes a low-stress agent, and
the low-stress agent contains a polybutadiene compound, an acrylonitrile-butadiene copolymerization compound, or a silicone compound,
wherein a total concentration of sodium ions and chlorine ions in the fixing thermosetting resin composition is equal to or less than 500 ppm, and
when a cure torque of the fixing thermosetting resin composition is measured over time at a measurement temperature of 175° C. using a curelastometer, the cure torque value at 60 seconds after measurement initiation is defined as $T_{60}$ and the maximum cure torque value up to 300 seconds after measurement initiation is defined as $T_{max}$, the ratio of the cure torque value at 60 seconds after measurement initiation to the maximum cure torque value up to 300 seconds after measurement initiation, $T_{60}/T_{max}(\%)$, is equal to or more than 50%.

31. The fixing resin composition according to claim 30, which is in the form of a powder, granule, or tablet.

* * * * *